US007870891B2

(12) United States Patent
Rule

(10) Patent No.: US 7,870,891 B2
(45) Date of Patent: Jan. 18, 2011

(54) SYSTEMS, DEVICES AND METHODS FOR REGULATING TEMPERATURES OF TANKS, CONTAINERS AND CONTENTS THEREIN

(75) Inventor: David D. Rule, Weiser, ID (US)

(73) Assignee: Kilr-Chilr, LLC, Weiser, ID (US)

( * ) Notice: Subject to any disclaimer, the term of this patent is extended or adjusted under 35 U.S.C. 154(b) by 760 days.

(21) Appl. No.: 10/857,530

(22) Filed: May 29, 2004

(65) Prior Publication Data
US 2005/0274499 A1    Dec. 15, 2005

(51) Int. Cl.
*F28F 9/22*    (2006.01)
*F28D 7/02*    (2006.01)

(52) U.S. Cl. .................. 165/160; 165/163; 165/129

(58) Field of Classification Search ............ 165/129, 165/140, 141, 108, 10, 48.1, 61, 154–156, 165/157, 159–160, 163
See application file for complete search history.

(56) References Cited

U.S. PATENT DOCUMENTS

| | | | |
|---|---|---|---|
| 348,115 A | 8/1886 | Egan | |
| 1,540,806 A | 6/1925 | Rohn | |
| 1,561,769 A | 11/1925 | Ballew | |
| 1,588,707 A | 6/1926 | Csiga | |
| 2,016,746 A | 10/1935 | Ireland | |
| 2,193,318 A * | 3/1940 | Floyd | 165/156 |
| 2,230,905 A * | 2/1941 | Popky | 62/285 |
| 2,316,273 A * | 4/1943 | Meyer et al. | 165/141 |
| 2,356,779 A * | 8/1944 | Morrison | 62/451 |
| 2,407,519 A * | 9/1946 | Jones | 62/405 |
| 2,610,478 A * | 9/1952 | Lofstedt | 62/515 |
| 2,662,749 A * | 12/1953 | Buschow | 165/141 |
| 2,715,627 A | 6/1956 | Reed | |
| 2,751,672 A | 6/1956 | Reed | |
| 2,847,193 A * | 8/1958 | Carter | 165/11.1 |
| 3,425,488 A * | 2/1969 | Jarreby | 165/90 |
| 3,458,917 A | 8/1969 | Mueller | |
| 3,478,669 A | 11/1969 | Jacques | |
| 3,482,625 A * | 12/1969 | Bray | 165/108 |
| 3,584,194 A | 6/1971 | Kautz et al. | |
| 3,643,733 A * | 2/1972 | Hall et al. | 165/81 |
| 3,814,003 A | 6/1974 | Vacano | |
| 3,965,694 A | 6/1976 | Vignal et al. | |
| 4,002,111 A | 1/1977 | Pujol | |
| 4,002,200 A | 1/1977 | Raskin | |
| 4,036,699 A | 7/1977 | Quigg | |
| 4,086,691 A * | 5/1978 | Smith, Jr. | 29/890.036 |

(Continued)

OTHER PUBLICATIONS

U.S. Appl. No. 11/433,323, filed May 2006, Rule.

(Continued)

*Primary Examiner*—Tho V Duong
(74) *Attorney, Agent, or Firm*—Wells St. John P.S.

(57) ABSTRACT

The invention encompasses a temperature regulating system that includes a shell configured to be received over an outer circumferential portion of a container. The shell has dimensions to form a cavity between the outer circumferential portion of the container and the shell. A material is provided in sealing engagement between the shell and the outer circumferential portion of the container to seal the cavity from the environment. A heat exchanger is provide in fluid communication with the cavity.

26 Claims, 31 Drawing Sheets

U.S. PATENT DOCUMENTS

| | | | |
|---|---|---|---|
| 4,092,976 A * | 6/1978 | Buckner | 126/508 |
| 4,120,425 A | 10/1978 | Bethurum | |
| 4,146,089 A | 3/1979 | Mueller et al. | |
| 4,148,355 A | 4/1979 | Gehring | |
| 4,164,902 A | 8/1979 | Maarleveld | |
| 4,179,902 A | 12/1979 | Mueller et al. | |
| 4,206,237 A | 6/1980 | Sakata et al. | |
| 4,212,950 A | 7/1980 | Adams | |
| 4,216,659 A * | 8/1980 | French | 62/186 |
| 4,250,954 A * | 2/1981 | Remlinger et al. | 165/99 |
| 4,305,456 A | 12/1981 | Mueller et al. | |
| 4,322,446 A | 3/1982 | Heess et al. | |
| 4,329,433 A | 5/1982 | Seebeck et al. | |
| 4,351,271 A | 9/1982 | Mueller et al. | |
| 4,487,785 A | 12/1984 | Epchtein | |
| 4,517,884 A | 5/1985 | Jandrich | |
| 4,560,565 A | 12/1985 | Wucherpfennig et al. | |
| 4,593,611 A | 6/1986 | Bruch | |
| 4,593,612 A | 6/1986 | Rieger | |
| 4,597,422 A | 7/1986 | Kovacevich, Jr. | |
| 4,664,689 A * | 5/1987 | Davis | 65/434 |
| 4,671,329 A | 6/1987 | Kovacevich, Jr. | |
| 4,700,528 A | 10/1987 | Bernard | |
| 4,708,938 A | 11/1987 | Hickinbotham | |
| 4,711,163 A | 12/1987 | Capuano | |
| 4,711,785 A | 12/1987 | Bruch | |
| 4,790,238 A | 12/1988 | Hsu | |
| 4,792,454 A | 12/1988 | Lemonnier | |
| 4,814,189 A | 3/1989 | Laude-Bousquet | |
| 4,829,782 A | 5/1989 | Mueller et al. | |
| 4,856,421 A | 8/1989 | Whitford | |
| 4,889,805 A | 12/1989 | Da Silva Telles et al. | |
| 4,908,219 A | 3/1990 | Modot et al. | |
| 4,969,391 A | 11/1990 | Haulot | |
| 4,979,377 A | 12/1990 | Fievet et al. | |
| 5,027,971 A | 7/1991 | Perryman | |
| 5,099,657 A | 3/1992 | Huang | |
| 5,167,274 A | 12/1992 | Mueller | |
| 5,173,318 A | 12/1992 | Leu et al. | |
| 5,287,918 A | 2/1994 | Banks et al. | |
| 5,365,830 A | 11/1994 | MacLennan et al. | |
| 5,385,204 A | 1/1995 | Boardman et al. | |
| 5,427,276 A | 6/1995 | Knuettel, II et al. | |
| 5,505,256 A | 4/1996 | Boardman et al. | |
| 5,509,462 A * | 4/1996 | Demko et al. | 165/45 |
| 5,564,289 A | 10/1996 | Hino | |
| 5,802,863 A | 9/1998 | Cowans | |
| 5,867,991 A | 2/1999 | Jalink et al. | |
| 5,925,563 A | 7/1999 | Redford | |
| 5,972,402 A | 10/1999 | Scholl et al. | |
| 5,975,335 A | 11/1999 | Witenhafer | |
| 6,125,736 A | 10/2000 | Marin | |
| 6,182,454 B1 | 2/2001 | McNeilan | |
| 6,279,457 B1 | 8/2001 | Francia | |
| 6,328,184 B1 | 12/2001 | Krol | |
| 6,397,624 B1 | 6/2002 | Horwell | |
| 6,668,915 B1 | 12/2003 | Materna | |
| 6,702,002 B2 * | 3/2004 | Wang | 165/80.3 |
| 6,703,055 B1 | 3/2004 | Klein et al. | |
| 6,722,421 B2 * | 4/2004 | MacKelvie | 165/154 |
| 6,877,504 B2 | 4/2005 | Schreff et al. | |
| 2001/0042443 A1 | 11/2001 | Francia | |
| 2002/0113072 A1 * | 8/2002 | Lane | 220/739 |

OTHER PUBLICATIONS

U.S. Appl. No. 11/657,957, filed Jan. 2007, Rule.
"Wine-Refrigeration," produced by Pasco Poly Tank—all updated articles from Pasco Poly's *Winery News*, edited by Lawrence Dawson, publication date unknown (11 pages total).
"Wine-Refrigeration," produced by Pasco Poly Tank—all updated articles from Pasco Polly's Winery News, edited by Lawrence Dawson, publication date unknown (11 pages total).
PCT/US07/10767, Sep. 16, 2008, PCT Search Report.
PCT/US07/10767, Sep. 16, 2008, PCT Written Opinion.
PCT/US07/10767, Nov. 11, 2008, PCT IPRP.
Brewer,"What are Metals" Material Science and Technololgy Teachers Workshop, University of Illinois Champaign-Urbana, http://matse1.mse.uiuc.edu.
Webster's Third New International Dictionary of the English Language Unabridged Pate 1579 vol. II H-R Encyclopedia Brittanica, Inc.

* cited by examiner

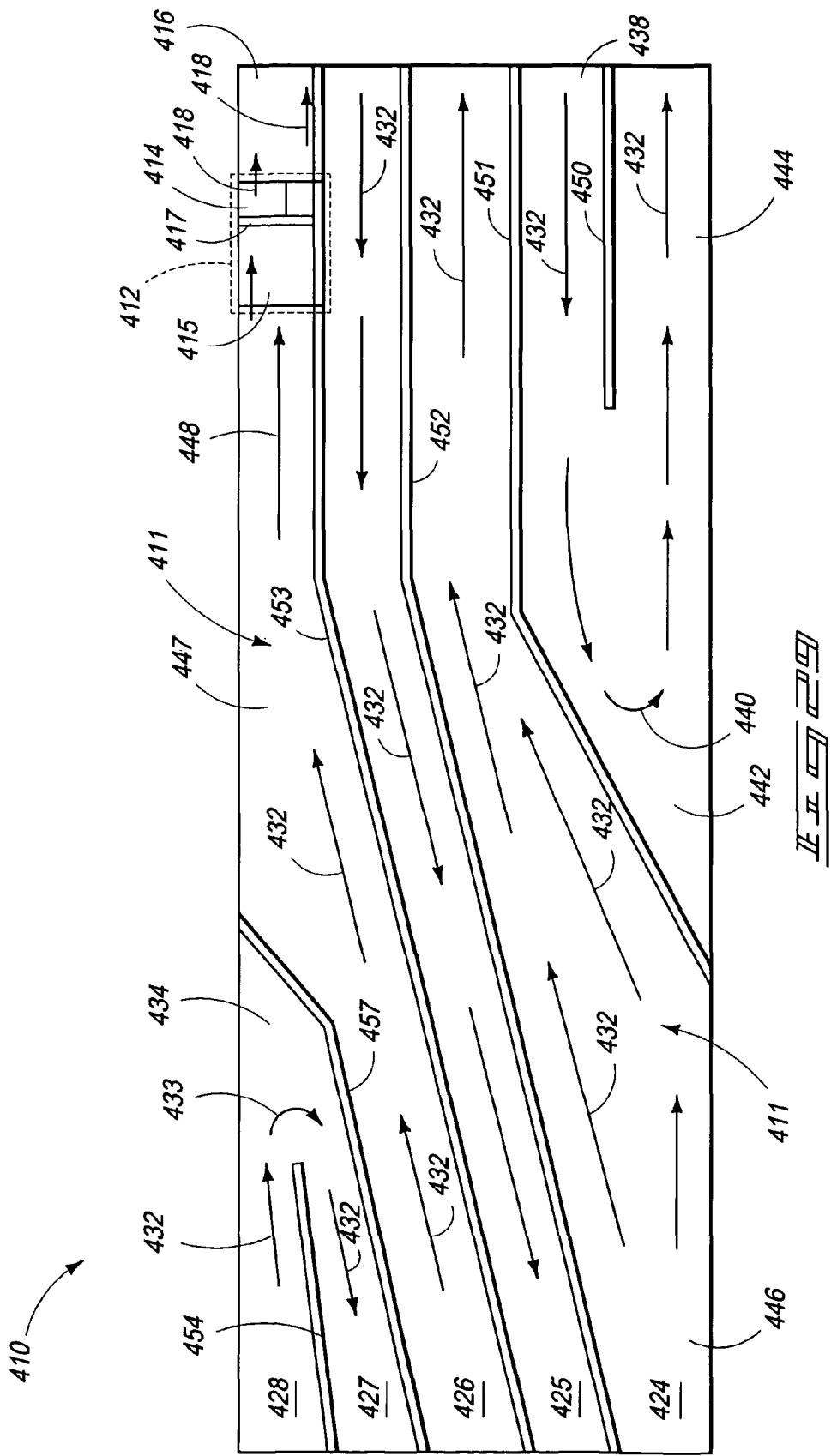

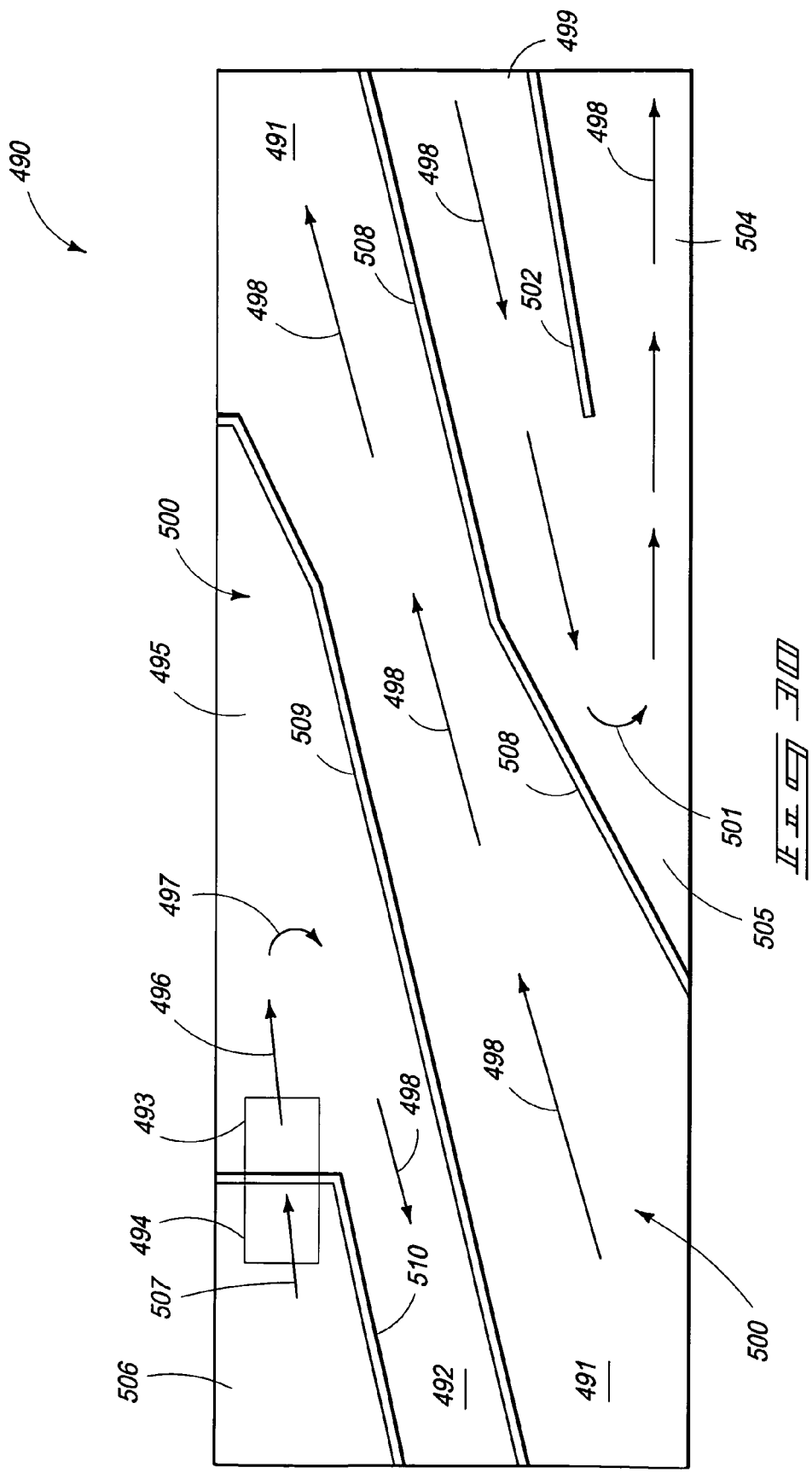

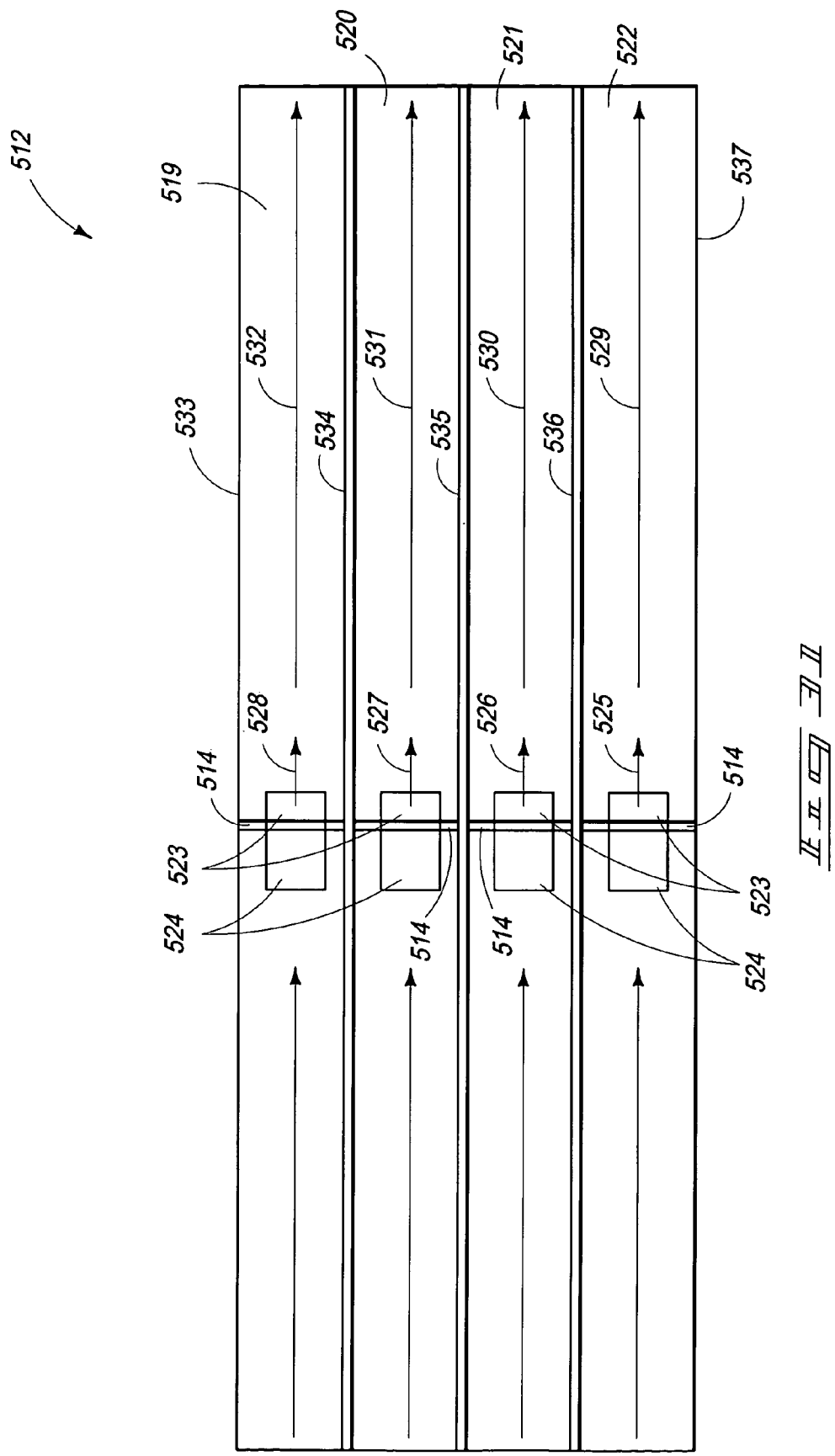

SYSTEMS, DEVICES AND METHODS FOR REGULATING TEMPERATURES OF TANKS, CONTAINERS AND CONTENTS THEREIN

TECHNICAL FIELD

The invention pertains to systems, devices and methods for regulating temperatures of containers, and more particularly to systems, devices and methods for regulating, adjusting and modifying temperatures of tanks and contents therein.

BACKGROUND OF THE INVENTION

There is always a need to improve temperature regulating systems for containers such as tanks and the contents therein. Systems for regulating or controlling temperatures of containers are used to heat or cool the contents of containers. Exemplary contents that are to be cooled and/or heated during storage and processing include, for example, fermentation, blending, storage, brewing mash, crush, batch, cooling, chilling, and cold-stabilization of wine, juice, vinegar, syrups, and other beverage production. For example, during a fermentation process of making wine, thermal energy or heat is generated. However, to produce a quality wine, the wine is ideally maintained at a specific temperature range during the fermentation process. Accordingly, the temperature of the wine must be regulated to control the fermentation process thereby increasing the likelihood of a production of a quality wine. However, the systems for regulating and controlling the temperature of a wine process, such as fermentation, are inadequate.

An exemplary prior art system for cooling wine is presented to discuss inadequacies of the system. FIG. 1 illustrates a prior art cooling system 2 for a stainless steel wine tank 9 which includes a cooling jacket 3, for example, a glycol cooling jacket wherein glycol is provided through the cooling jacket 3 as a liquid coolant. These cooling systems 2 are expensive, and therefore, only 25% to 50% of a sidewall surface area of tank 9 is covered by an exemplary prior art cooling jacket 3.

During cooling of a wine mass, convection currents in the wine mass are an important factor contributing to maintaining a uniform temperature throughout the wine mass. Without the capability of maintaining a uniform temperature throughout the wine mass, control or regulation of the temperature of the wine mass is difficult to achieve. A study has determined that the use of cooling systems 2 create significant temperature stratification regions within the wine mass. For example, using a cooling jacket 3 over a third of the sidewall surface area of tank 9 as illustrated in FIG. 1, a region 6 of cool wine located adjacent and below cooling jacket 3 develops that is sandwiched between two regions 4 and 7 of warm wine. Warm wine regions 4 and 7 are located at the uppermost and lowermost locations, respectively, of tank 9. The temperature stratification in the wine mass develops because region 7 of warm wine exerts an upward pressure or force 600 against an equal and opposite downward pressure or force 602 exerted by region 6 of cool wine establishing a temperature stratification boundary 5. With the development of this temperature stratification boundary 5, convection currents cease to flow. Moreover, convection currents do not influence region 4 of warm wine because this warmer wine tends to "float" on top of region 6 of cool wine. Without the flow of convection currents, uniform temperature of the wine mass is difficult to achieve or be maintained. Without uniform temperatures, the capability to control and regulate the temperature of the wine fails along with the opportunity to optimize wine quality.

Moreover, a temperature monitoring device 8 is routinely placed just below the cooling jacket 3. Accordingly, the temperature monitoring device 8 monitors only one region of the wine mass, and that region includes the coolest wine in the tank 9, that is, region 6. Consequently, reading the temperature monitoring device 8 would not indicate there is a temperature stratification problem developing in the wine mass to be dealt with, and therefore, regions 4 and 7 may be out of the optimal temperature range for production of quality wine affecting the quality of the entire wine mass.

There is a need to improve temperature regulating, controlling and adjusting systems for containers such as tanks and the contents therein.

SUMMARY OF THE INVENTION

In one aspect, the invention encompasses a temperature regulating system that includes a shell configured to be received over an outer circumferential portion of a container. The shell has dimensions to form a cavity between the outer circumferential portion of the container and the shell. A material is provided in sealing engagement between the shell and the outer circumferential portion of the container to seal the cavity from the environment. A heat exchanger is provide in fluid communication with the cavity.

In another aspect, the invention encompasses a system for regulating and controlling temperatures of a tank. The system includes a tank with an outer periphery and a sheet of material is provided over a portion of the outer periphery of the tank. The sheet of material provides a sealed void between the sheet of material and the outer periphery of the tank. A heat exchanger is in fluid communication with the sealed void wherein the heat exchanger is configured for circulating a fluid medium through the sealed void over the portion of the outer periphery of the tank to regulate the temperature of the tank.

In still another aspect, the invention encompasses a method for regulating or controlling temperatures of a container. The method includes enclosing an outer circumferential portion of a container with a material to form an enclosed cavity between the container and material. At least a portion of the outer circumferential portion includes a thermally conductive material. The method further includes circulating a fluid medium within the enclosed cavity and in heat transfer relation with the outer circumferential portion of the container.

In still another aspect, the invention encompasses a device for regulating temperatures of a tank. The device includes an insulative cover of flexible material that has an inner surface and has a pair of spaced-apart openings. A plurality of ridges extend inwardly from the inner surface of the insulative cover, and each of the ridges has an elongated portion that extends along the inner surface of the insulative cover. The plurality of ridges are provided in spaced-apart relation and extend generally parallel to one another so as to form a channel between each adjacent pair of ridges. The plurality of ridges are configured to guide fluid flow in a circuitous path from one of the pair of openings and direct the fluid flow to the other of the pair of openings.

BRIEF DESCRIPTION OF THE DRAWINGS

Preferred embodiments of the invention are described below with reference to the following accompanying drawings.

FIG. 29 is a simplified elevational view of an unrolled inner surface of a device for regulating the temperature of a tank according to yet even another embodiment of the present invention.

FIG. 30 is a simplified elevational view of an unrolled inner surface of a device for regulating the temperature of a tank according to another embodiment of the present invention.

FIG. 31 is a simplified elevational view of an unrolled inner surface of a device for regulating the temperature of a tank according to yet another embodiment of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
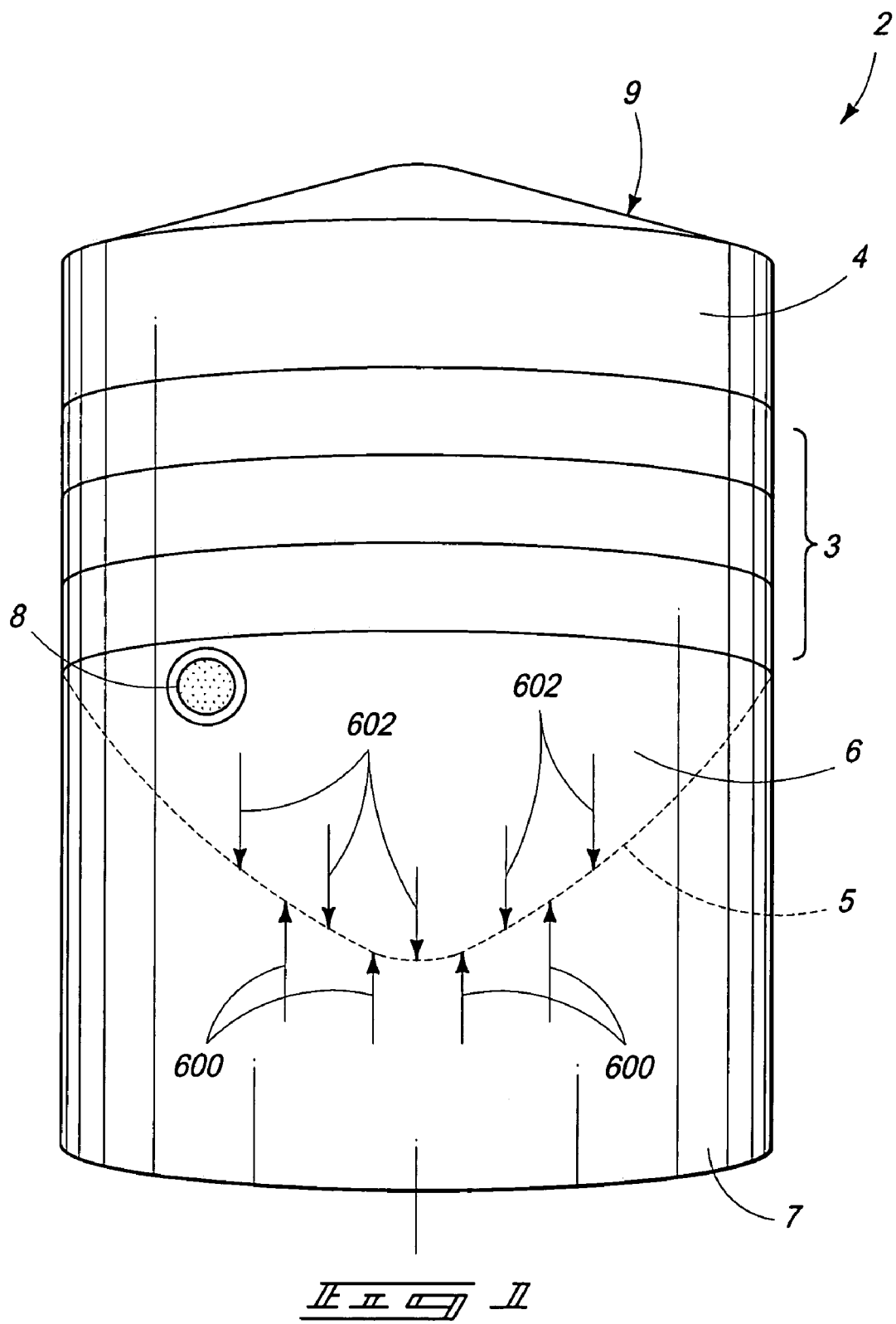
FIG. 1 is a vertical perspective view of a prior art tank used in the wine industry illustrated with a cooling jacket for cooling the contents of the tank.
Figure 2:
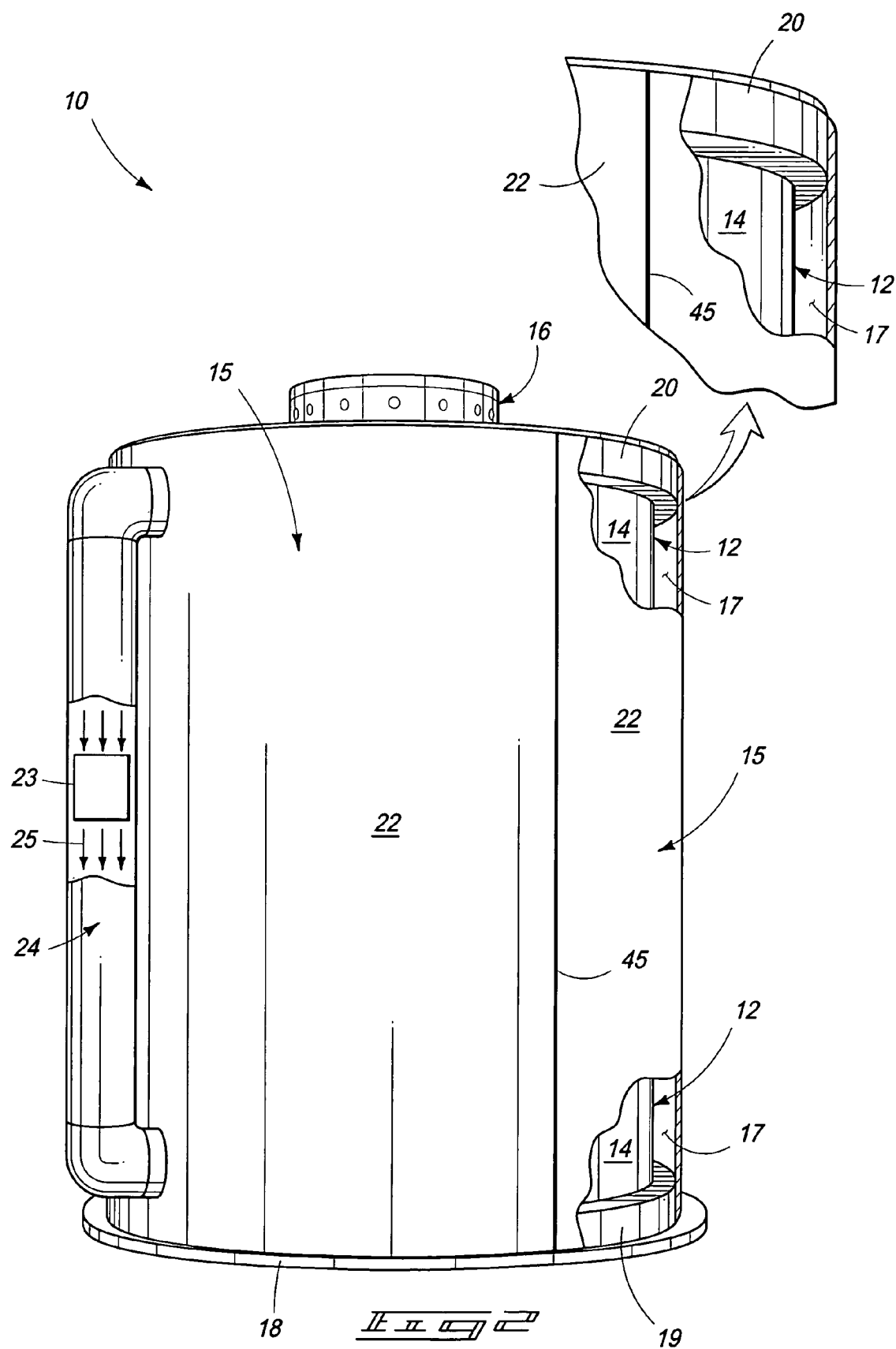
FIG. 2 is a vertical perspective view of a system for regulating the temperature of a tank according to a first embodiment of the present invention.

FIG. 2 illustrates a system 10 for regulating, adjusting and modifying the temperature of a structure, for example, a container or tank 12 and the contents therein, according to one embodiment of the present invention. Container or tank 12 has an outer periphery wall 14 or outer circumferential portion (which can include an entirety of all exposed walls of a container or tank, and in this exemplary embodiment is illustrated as the sidewall, sidewall surface or sidewall surface area). An exemplary tank 12 is formed of a thermally conductive material. A layer of material 15, for example an insulative material or layer, is provided over and spaced from at least a portion of the surface area of the outer periphery wall 14 of container 12 to leave a gap, void, space or cavity (or fluid passageway) between the outer periphery wall 14 and layer or material 15.

In this exemplary embodiment, material 15 is provided to surround and enclose the outer periphery wall 14 of tank 12, and therefore, is preferably a material that can be formed, molded or curved to surround the outer periphery wall 14, for example, a sheet of material. An exemplary sheet of material 15 includes a flexible material such as foam material, plastics, steel, metals, polymers, ceramics, composites and wood. The sheet of material 15 in this exemplary embodiment surrounds or encloses substantially an entirety of outer periphery wall 14 and is configured to substantially seal void or cavity 17 from the environment. It should be understood that material 15 could be constructed by a mold, or formed from a molded material, for example, a malleable substance.

A first strip of material, (hereinafter referred to as "first circumferential ring 19") extends outwardly from and encircles a small bottom portion of the outer periphery wall 14 of container 12. A second strip of material, (hereinafter referred to as "second circumferential ring 20") extends outwardly from and encircles a small top portion of the outer periphery wall 14 of container 12 elevationally above the first circumferential ring 19. First and second circumferential rings 19 and 20 may include the same material or different materials with exemplary materials including foam, high density polyethylene foam, Styrofoam and high density Styrofoam. Additionally, first and second circumferential rings 19 and 20 are secured to container 12 by an adhesive, for example, glue.

Sheet 15 is provided over container 12 and secured to respective first and second circumferential rings 19 and 20 and discussed more thoroughly subsequently. First and second circumferential rings 19 and 20 may have a single function such as a spacer for sheet 15 by spacing sheet 15 from the outer periphery wall 14 of container 12 to begin the formation of sealed void or cavity 17. Alternatively, first and second circumferential rings 19 and 20 may have a single function such as a sealer for sheet 15 by sealing the void or cavity 17 to finish the formation of sealed void or cavity 17. Additionally, first and second circumferential rings 19 and 20 may have a dual function combining the sealer and spacer function.

System 10 further includes a fluid tube or duct 24 extending between respective portions of the sheet 15 and functions as a conduit for movement of a fluid medium between respective openings in sheet 15 (see FIG. 5) and through sealed void or passageway 17. The tube 24 includes a forced air device, for example, a blower or fan (see FIG. 6) to force and direct the fluid medium 25 such as air to circulate through the sealed void 17 against outer periphery wall 14 of tank 12. Exemplary blower or fan could include a squirrel cage device, a centrifugal device, or turbine. Additionally, an exemplary tube 24 includes a heat exchanger 23 for heating or cooling the fluid medium 25 to regulate the temperature of container 12 by providing the heated or cooled fluid medium through the sealed void 17 over and against the outer periphery wall 14 of tank 12.

Figure 3:
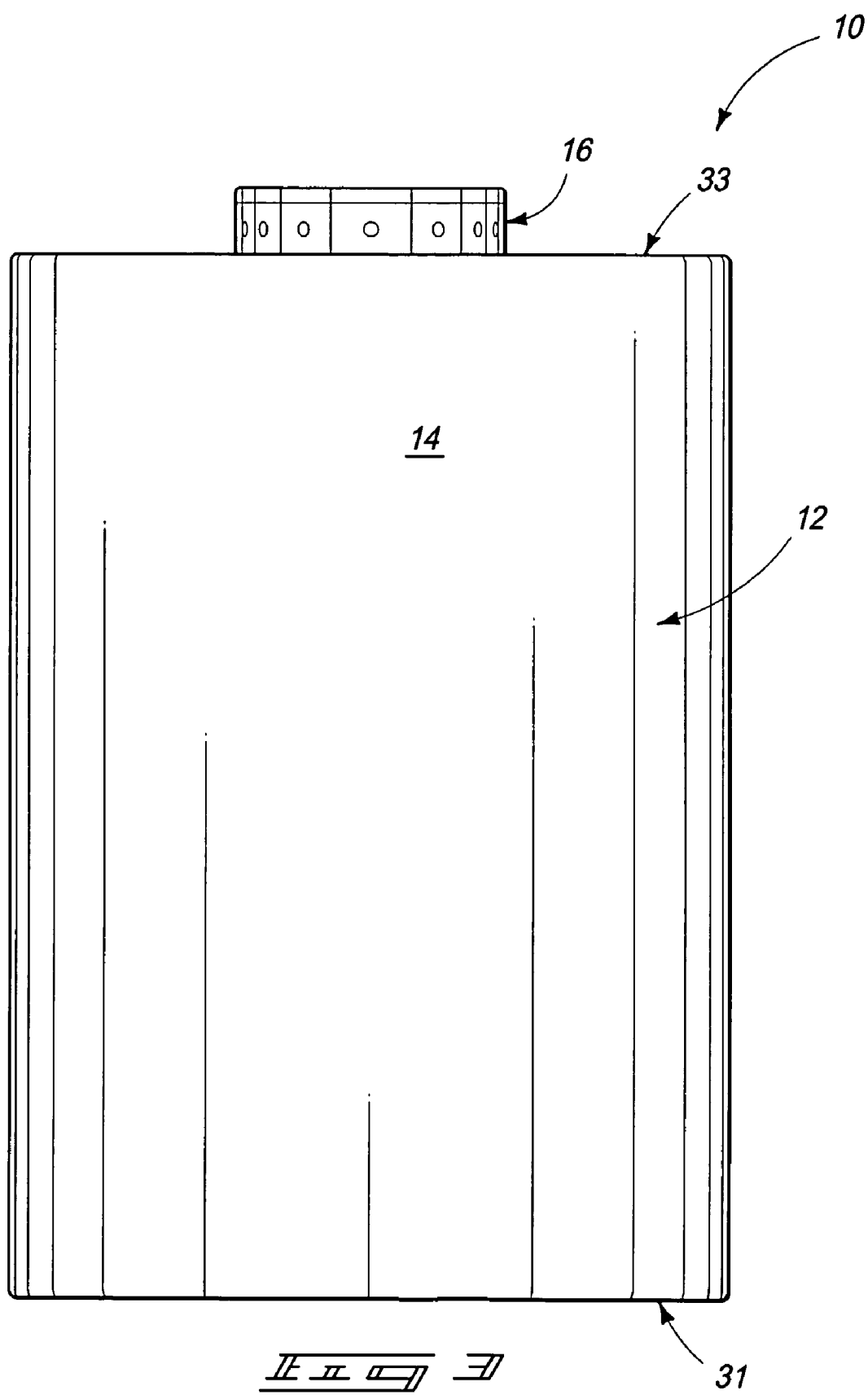
FIG. 3 is a vertical perspective view of a tank of the FIG. 2 system at a method step according to the present invention.

FIG. 3 illustrates an exemplary structure, such as a container or tank 12 for system 10 to begin one embodiment of a method to form system 10. Exemplary containers 12 include vats, barrels, kegs and tanks, for example, for the food and beverage industries. Such exemplary containers 12 include contents that are to be cooled and/or heated during storage and processing, for example, fermentation, blending, storage, brewing mash, crush, batch, cooling, chilling, and cold-stabilization of wine, juice, vinegar, syrups, and other beverage production. Tank 12 includes a bottom wall indicated generally by numeral 31, the outer periphery wall 14 which in this example is shown as a cylindrical shape extending upward from the bottom wall 31, and the outer periphery wall 14 terminating to form a top wall indicated generally by numeral 33. A covered opening 16 in top wall 33 provides an ingress and egress for the contents of tank 12 and individual access when the inside of tank 12 is scheduled for servicing.

While the illustrated tank 12 has a cylindrical shape with the circumference of outer periphery wall 14 forming a circular cross section, it should be understood that tank 12 could have any shape configuration, for example, the outer periphery wall 14 could form a square, rectangular, hexagon or oval cross section. Moreover, tank 12 for system 10 can already exist in the field, for example, such as a wine tank already existing at a winery wherein the existing tank will be incorporated into system 10. Alternatively, tank 12 can be provided for system 10 by a tank manufacturer or producer. Furthermore, tank 12 can be formed from any material, for example, polymers, plastic, fiberglass, stainless steel and polyethylene. Additionally, tank 12 can be formed of any size, for example, 1 gallon to 20,000 gallons.

Figure 4:
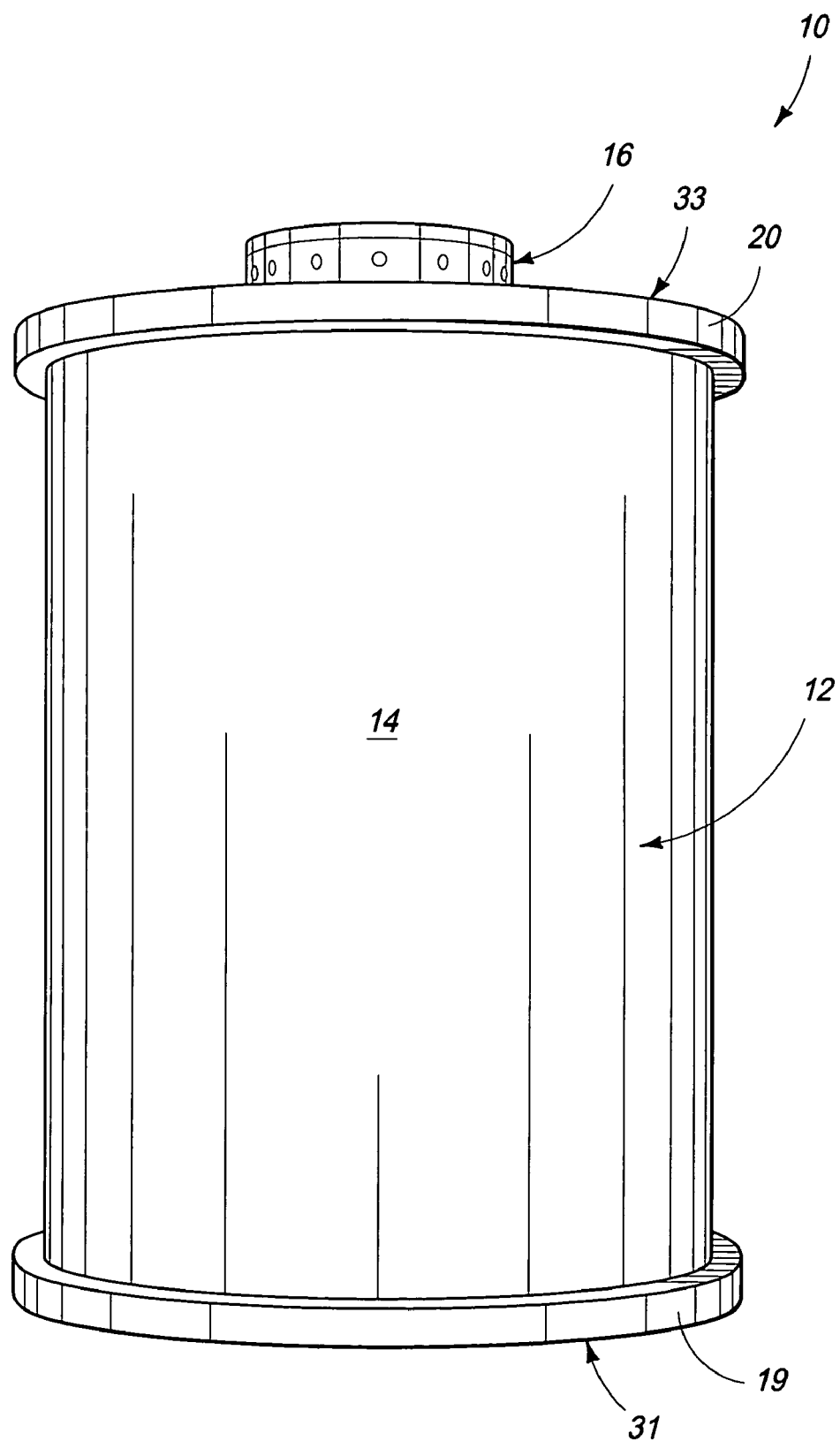
FIG. 4 is a vertical perspective view of the FIG. 3 system at a method step subsequent to the method step of FIG. 3.

FIG. 4 illustrates tank 12 at a method step subsequent to FIG. 3. The first circumferential ring 19 is positioned and secured to tank 12 proximate bottom wall 31 and encircles the outer periphery wall 14 of tank 12. Alternatively, rings 19 and 20 could be molded into the tank structure. The second circumferential ring 20 is positioned and secured to tank 12 proximate top wall 33 and encircles the outer periphery wall 14 of tank 12. Exemplary materials for rings 19 and 20 include flexible foam, molded polymer composite and formed metal.

Figure 5:
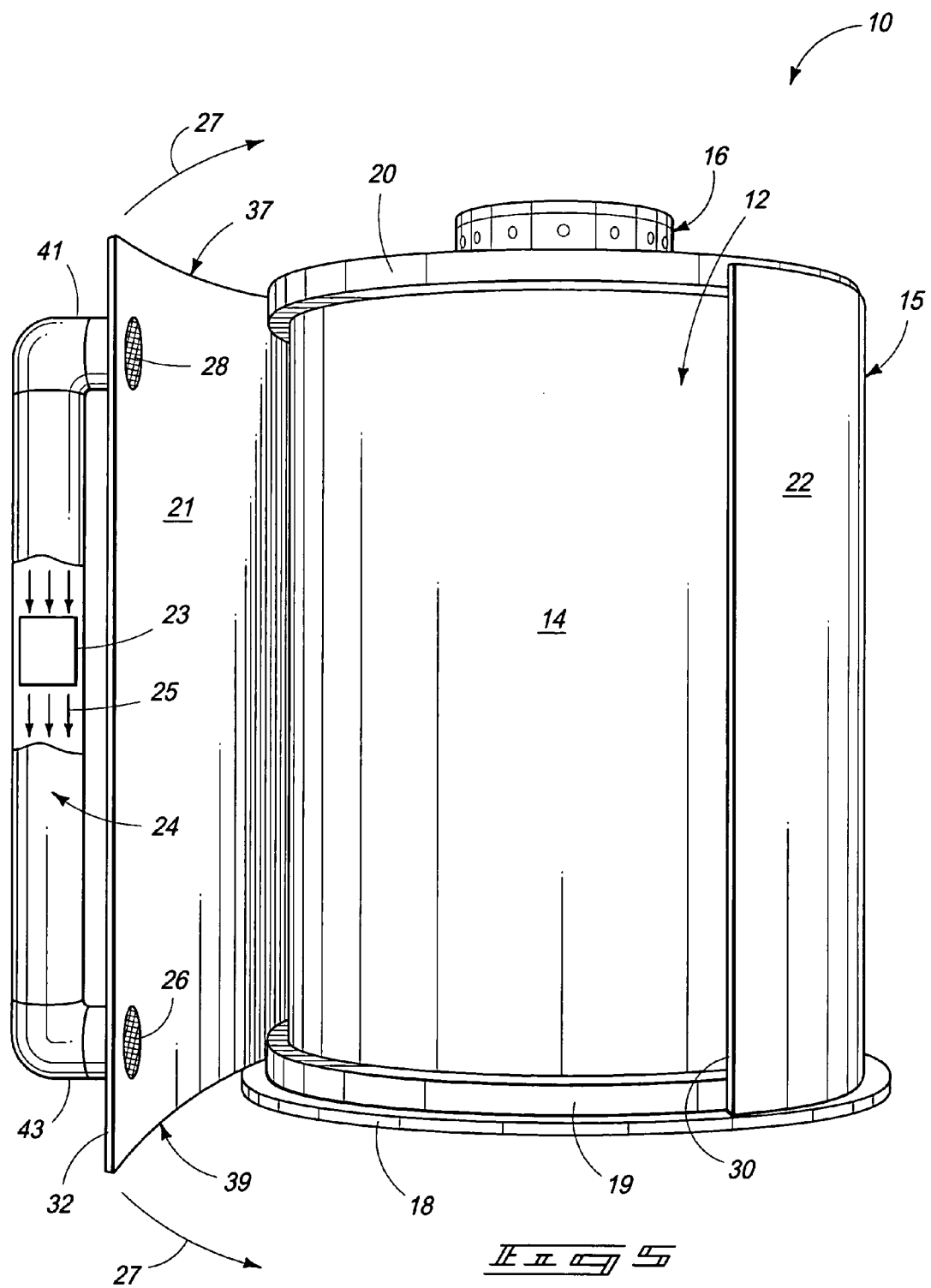
FIG. 5 is a vertical perspective view of the FIG. 4 system at a method step subsequent to the method step of FIG. 4.

FIG. 5 illustrates the sheet of flexible material 15 being provided or wrapped in direction 27 over and around tank 12. An exemplary construction of sheet 15 includes one, two or more layers, for example, a metal layer adjacent or secured to an insulative layer. An exemplary metal layer includes a 20 gauge metal and an exemplary insulative layer includes closed cell foam of at least an inch in thickness. The exemplary insulative layer may be blown on the metal layer or attached in sections. An exemplary construction of sheet 15 as a single layer includes plastic or foam material having a thickness of ⅛ inch to 8 inches depending on the diameter of tank 12. Sheet 15 includes an inner surface 21 opposite an outer surface 22 with the inner surface 21 facing outer periphery wall 14 of tank 12 after sheet 15 is positioned over tank 12. The wrapping step of sheet 15 is finished when edge 32 of sheet 15 is positioned adjacent edge 30 of sheet 15 to substantially enclose outer periphery wall 14 of tank 12 thereby forming sealed void, passageway or cavity 17. The sealed void or cavity 17 is established between inner surface 21 of sheet 15 and outer periphery wall 14 of tank 12. The sealed void or cavity 17 is further established between respective first and second circumferential rings 19 and 20. An insulative base 18 is provided to insulate the bottom wall of tank 12 from a surface on which tank 12 rests. Optionally, sheet 15 is supported upon and additionally secured to insulative base 18. Sheet 15 may be secured to tank 12 by glue, adhesive, weld studs and screws.

Please note, FIG. 4 illustrates the method step of providing first and second circumferential rings 19 and 20 positioned and secured to tank 12. However, optionally, this step could be deleted by providing first and second circumferential rings 19 and 20 positioned and secured to sheet 15 proximate edges 37 and 39, respectively.

While sheet 15 is illustrated as being sized to cover substantially an entirety of the outer periphery wall 14 of tank 12, it should be understood that sheet 15 can be sized to cover any portion of outer periphery wall 14 of tank 12. For example, sheet 15 could be sized to be capable of covering 5% to 100% of the surface area of outer periphery wall 14, for example, 25% of the surface area of outer periphery wall 14. Moreover, sheet 15 can be positioned over any portion of the surface area of outer periphery wall 14. That is, if an exemplary sheet 15 is sized to cover a third (33.3%) of an exemplary surface area of outer periphery wall 14, the sheet 15 could be positioned to cover a top third of the outer periphery wall 14, to cover a bottom third of the outer periphery wall 14, or positioned any where between the respective bottom and top walls of tank 12. Alternatively, sheet 15 could be configured to cover substantially an entirety of tank 12, that is, to include respective bottom and top walls along with the outer periphery wall 14 extending there between.

Still referring to FIG. 5, system 10 includes a tube 24 extending between openings 26 and 28 formed in sheet 15. Tube 24 provides a heat exchanger 23 in fluid communication with sealed void or cavity 17 and is configured to provide a cooled or heated fluid medium 25 into sealed void or cavity 17 against tank 12. Accordingly, one of openings 26 and 28 acts as an inlet while the other of openings 26 and 28 acts as an outlet depending on which direction the fluid medium 25 is being driven through tube 24. It should be understood that guide or steering vanes (not shown) could be provided over openings 26 and 28 to direct the fluid medium in the proper direction and sustain the momentum of the flowing fluid medium with a goal of producing a cyclone effect of moving the fluid around tank 12 within the cavity 17.

Please note, while tube 24 is shown having extension portions 41 and 43 extending generally perpendicularly from sheet 15, extension portions 41 and 43 could be provided at any angle relative sheet 15 such that the fluid medium driven into cavity 17 is directed in a more tangential direction relative the outer periphery wall 14 of tank 12. Such a tangential flow of the fluid medium may facilitate fluid flow of the fluid medium around tank 12. Openings 26 and 28 may be modified to be shaped in an oblong or oval configuration to facilitate such an angled orientation of extension portions 41 and 43.

Additionally, FIG. 5 illustrates openings 26 and 28 substantially vertically aligned such that tube 24 is substantially vertically oriented relative tank 12. However, one of openings 26 and 28 (or both openings if moved in laterally opposite directions) could be laterally moved along outer surface 22 of sheet 15 such that tube 24 would be helically oriented around tank 12. Please note further, tube 24 is shown secured to sheet 15 before sheet 15 is secured to tank 12. However, an alternative method step includes tube 24 to be secured to sheet 15 after sheet 15 is secured to tank 12. Exemplary sizes of duct or tube 24 preferably could handle 200 cubic feet of fluid flow per 12,000 btu used by system 10, or have a 50 square inch cross section per 12,000 btu used by system 10.

Figure 6:
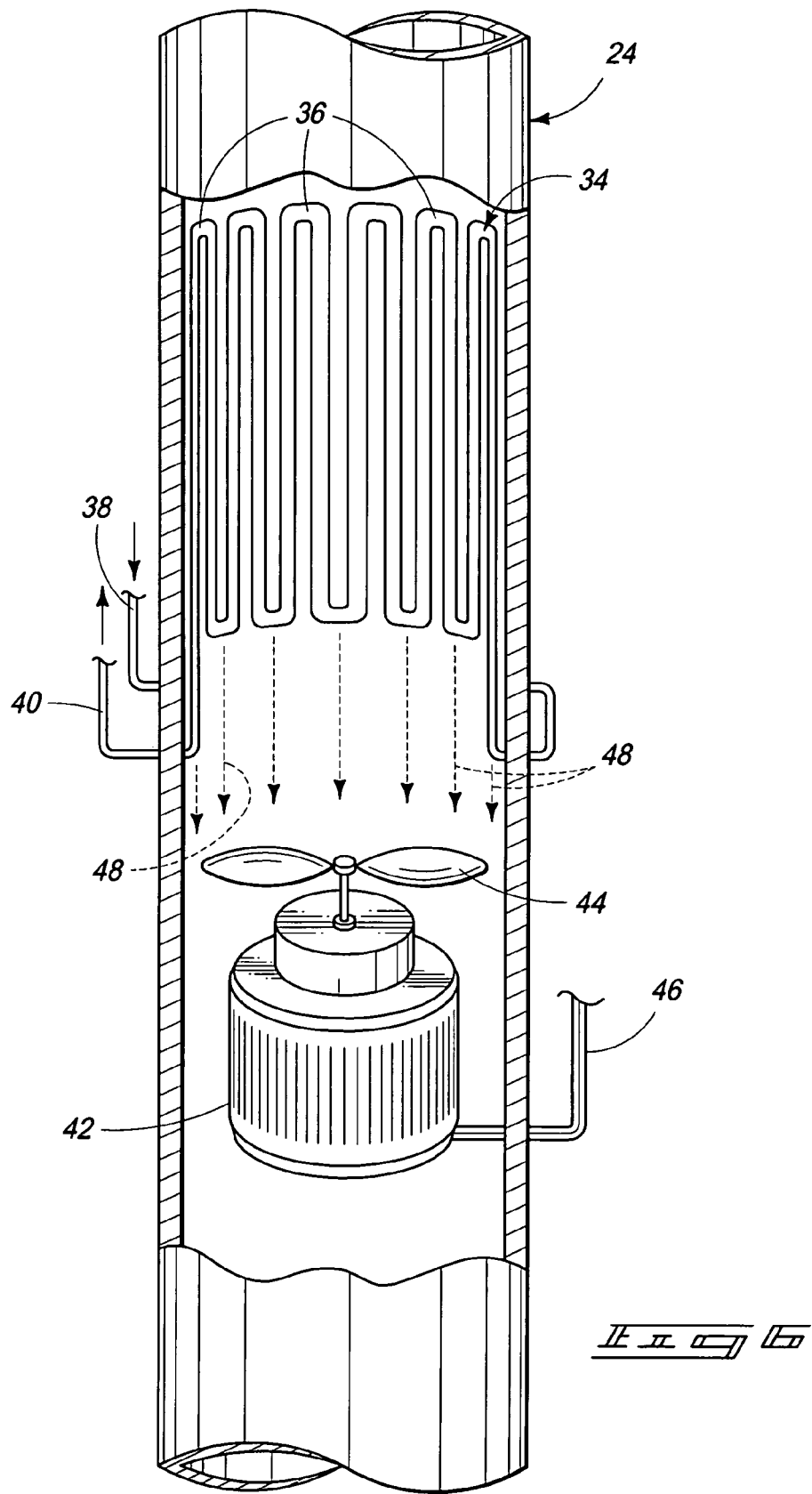
FIG. 6 is a partial cut-away view of a tube section of the FIG. 2 system according to an exemplary embodiment of the present invention.

FIG. 6 illustrates an exemplary heat exchanger that includes fan blades 44 driven by an electric motor 42 (electric cord 46) configured to drive a fluid medium, for example, a gas such as air, over a plurality of tubes and fins, generally referred to as coils 36, through tube 24 into cavity 17 of system 10. Other exemplary gases include carbon dioxide, argon and inert gases. If contents of tank 12 are to be cooled, the fluid medium can be provided as cooled air wherein the plurality of coils 36 are supplied with a refrigerant source, for example, glycol, freon, water, etc by inlet 38 and outlet 40. If freon is provided as the source, the plurality of coils 36 function as evaporation coils. Alternatively, if glycol is provided as the source, which is already available at most winery sites, the plurality of coils 36 function as a radiator system since the glycol will be a liquid during the entire process. Additionally, if the contents of tank 12 are to be heated, the fluid medium can be provided as heated air wherein the plurality of coils 36 are supplied with a heated source, for example, heated glycol. The plurality of coils 36 could be used as a condenser of high pressure hot freon gas and functioning as a heat pump.

In operation, system 10 will heat or cool tank 12 and the contents therein, and for this discussion of operation, cooling the tank 12 will be described. An exemplary tank is cylindrical wherein the outer periphery wall 14 which is a cylindrical sidewall of tank 12 defines substantially an entirety of the height of cylindrical tank 12. The heat exchanger 23, for example an air conditioning unit or chiller, cools and dehumidifies a fluid medium 25, for example, air wherein the source is ambient air. Accordingly, the air is cooled, provided at atmospheric pressure, and provided as dry air lacking the moisture content of the ambient air. That is, in an exemplary embodiment, system 10 operates under atmospheric pressure conditions. The chiller 23 forces or drives the cooled air 25 to begin an air flow through tube 24 to an inlet 26 wherein steering vanes in inlet 26 can direct the cooled, dehumidified air in a generally tangential relation to the cylindrical sidewall 14 of tank 12 which facilitates continued air flow around tank 12.

Sheet or layer 15, for example, an insulative layer is provided spaced from the cylindrical sidewall 14 to provide a gap there between. Insulative layer 15 covers substantially an entirety of the cylindrical sidewall 14 or height of tank 12 wherein the insulative layer 15 is sealed to tank 12 to enclose the space or gap forming the cavity or passageway 17 that extends substantially over an entirety of the cylindrical sidewall 14 or height of cylindrical tank 12. Tube 24 is in fluid communication with cavity 17 permitting the flow of cooled air to enter cavity 17 through inlet 26 which is located at a lower portion of the cylindrical sidewall 14 of tank 12. The cooled air is directed to flow tangentially to the cylindrical sidewall 14 around tank 12. As the cooled air contacts the cylindrical sidewall 14 of tank 12, a heat transfer relationship is established between the cylindrical sidewall 14 and cooled air wherein heat from the tank 12 is transferred to the air.

As the air warms, it will rise along, and move spirally around and against, the cylindrical sidewall 14 up the height of tank 12 to continue the heat transfer relationship thereby cooling an entirety of the height of tank 12. Accordingly, the purpose of positioning the inlet 26 at a lower portion of the cylindrical sidewall 14 is to allow the cooled air to travel or flow against and up the height of tank 12 as the air warms to provide the cooling effect along the entirety of the height of tank 12. Air continues to flow spirally up and against the height of tank 12 and reenters tube 24 through outlet 28 as warm air (relative the cool air provided from the chiller) to begin the process again. That is, the chiller receives the warm air from the outlet 28, cools and dehumidifies the air, and directs the cooled air downward to the inlet 26 to be recirculated into cavity 17 to continue the heat transfer relationship with the cylindrical sidewall 14 of tank 12. By this method and operation, the temperature of the tank 12 and contents therein are modified, controlled, adjusted and regulated.

It should be understood that subsequent embodiments describe providing baffles configurations and patterns in cavity 17 to establish fluid flow channels in the cavity having various channel patterns. Accordingly, air flow is more readily directed to specific surface areas of the tank and more readily maintained in contact with the surface area to facilitate the heat transfer relationship with tank 12. Moreover, it should be understood that having air as the fluid medium creates a responsive system 10 wherein spikes in temperature of the contents of a tank can be controlled. Air can be chilled swiftly and efficiently, and moved easily without much heat loss due to friction for a quick response time to address the spikes in temperature of the contents of system 10.

Figure 7:
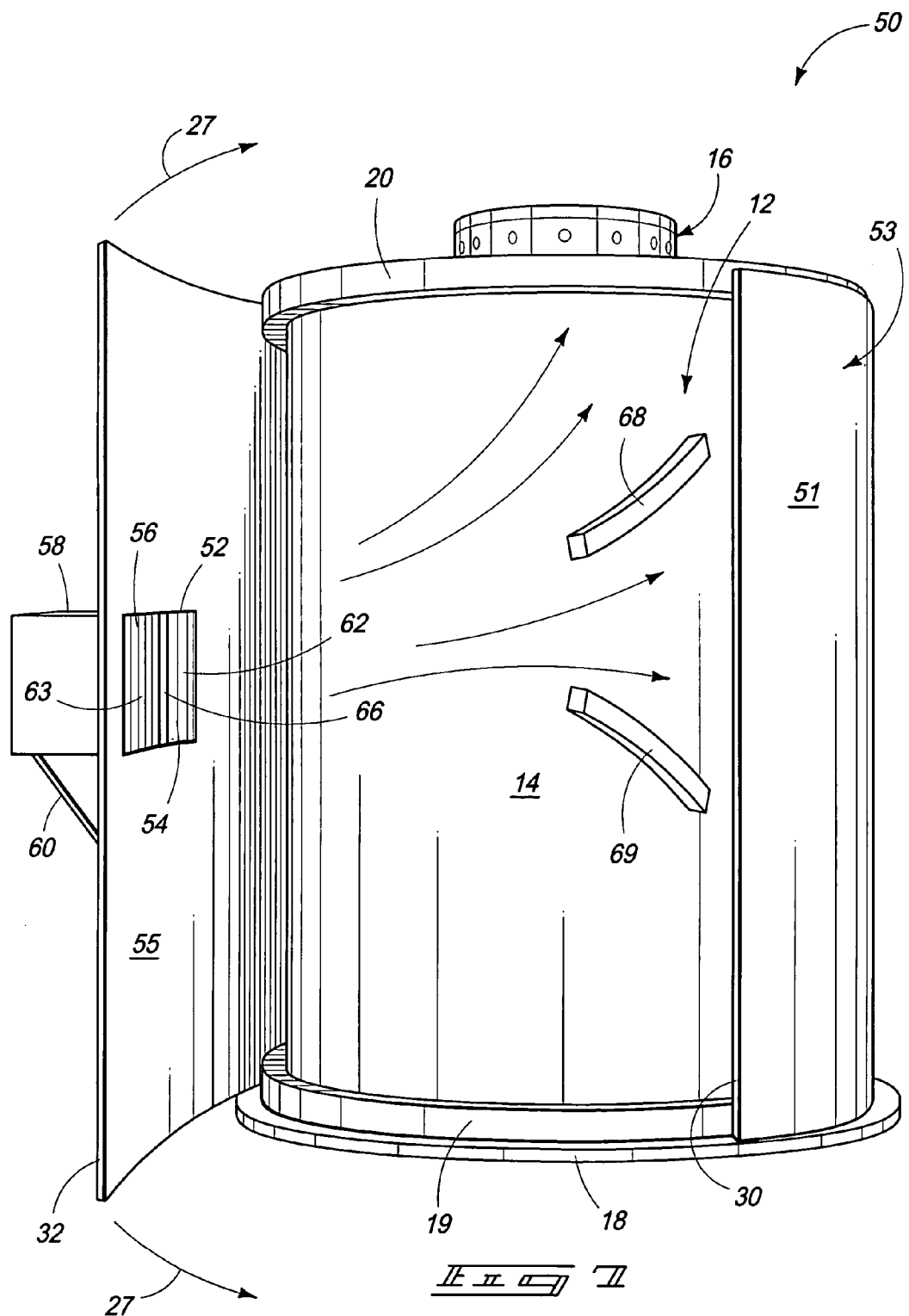
FIG. 7 is a vertical perspective view of a system for regulating the temperature of a tank according to a second embodiment of the present invention and shown during assembly.

FIG. 7 illustrates a system 50 for regulating the temperature of a container 12 according to another embodiment of the present invention. In describing this embodiment, like numerals from the preceding discussion of the previously described embodiment are utilized where appropriate, with differences being indicated by different numerals. System 50 includes a container 12 having an outer periphery wall 14. First and second circumferential rings 19 and 20 extend outwardly from and encircle the outer periphery wall 14 of container 12. A sheet of flexible material 53 (or covering material, or enclosing material) is provided over container 12 contacting respective first and second circumferential rings 19 and 20 and establishing a sealed void or cavity (not shown by a reference number) between container 12 and sheet 53 and extending between respective first and second circumferential rings 19 and 20. Sheet 53 includes a heat exchanger 58, for example, an air conditioning unit, supported by arm 60 secured to an outer wall 51 of sheet 53. Sheet 53 includes an opening 52 divided by vane 66 into openings 54 and 56 shown through an inner wall 55 of sheet 53. Openings 54 and 56 form an inlet and outlet to provide fluid communication between the heat exchanger 58 and seal void or cavity between container 12 and sheet 53. Openings 54 and 56 include deflection devices, such as steering vanes 62 and 63 to steer or direct fluid flow. Vanes 68 and 69 are secured on tank 12 to facilitate fluid flow over an entirety of area of outer periphery wall 14 of tank 12. Alternatively, vanes 68 and 69 could be secured to sheet 53.

Figure 8:
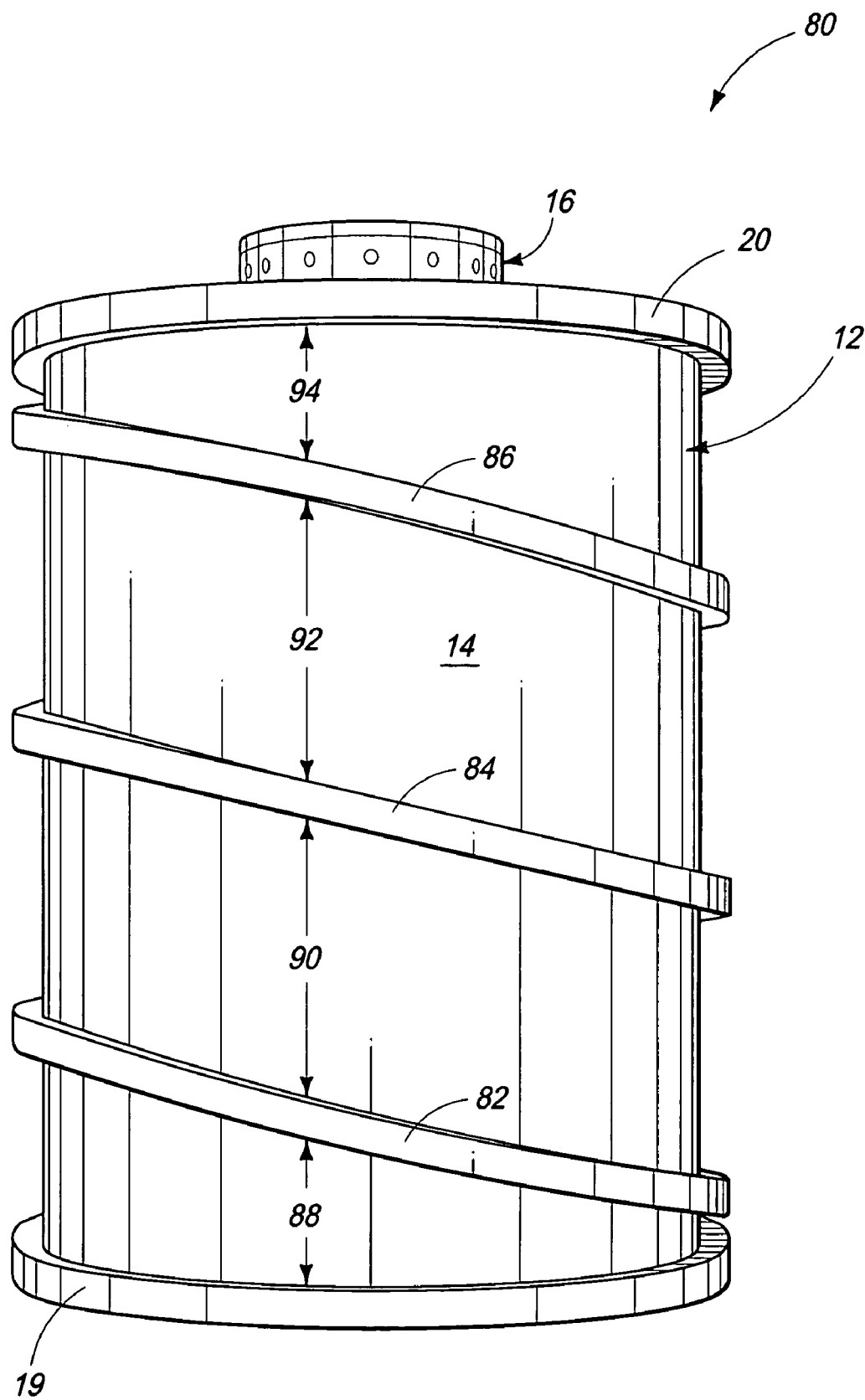
FIG. 8 is a vertical perspective view of a system for regulating the temperature of a tank according to a third embodiment of the present invention, with the system illustrated at a method step according to the present invention.

FIG. 8 illustrates a system 80 for regulating the temperature of a container 12 according to another embodiment of the present invention. In describing this embodiment, like numerals from the preceding discussion of the previously described embodiments are utilized where appropriate, with differences being indicated by different numerals. System 80 includes a container 12 having an outer periphery wall 14. First and second circumferential rings 19 and 20 extend outwardly from and encircle the outer periphery wall 14 of container 12. Container or tank 12 further includes respective vanes or baffles 82, 84 and 86 secured to the outer periphery wall 14 and shown in a generally helical configuration extending upward and surrounding outer periphery wall 14 of tank 12. The material for vanes or baffles 82, 84 and 86 could be a continuous length of material extending circuitously around tank 12, or patterned in discrete segments not shown in this view. Moreover, vanes or baffles 82, 84 and 86 could include numerous other patterns or configurations other than the helical configuration shown, and such exemplary various other patterns are discussed more thoroughly subsequently with reference to FIGS. 25-31. In combination, respective vanes or baffles 82, 84 and 86 and first and second circumferential rings 19 and 20 form respective channels 88, 90, 92 and 94 to receive and direct the flow of the fluid medium.

Figure 9:
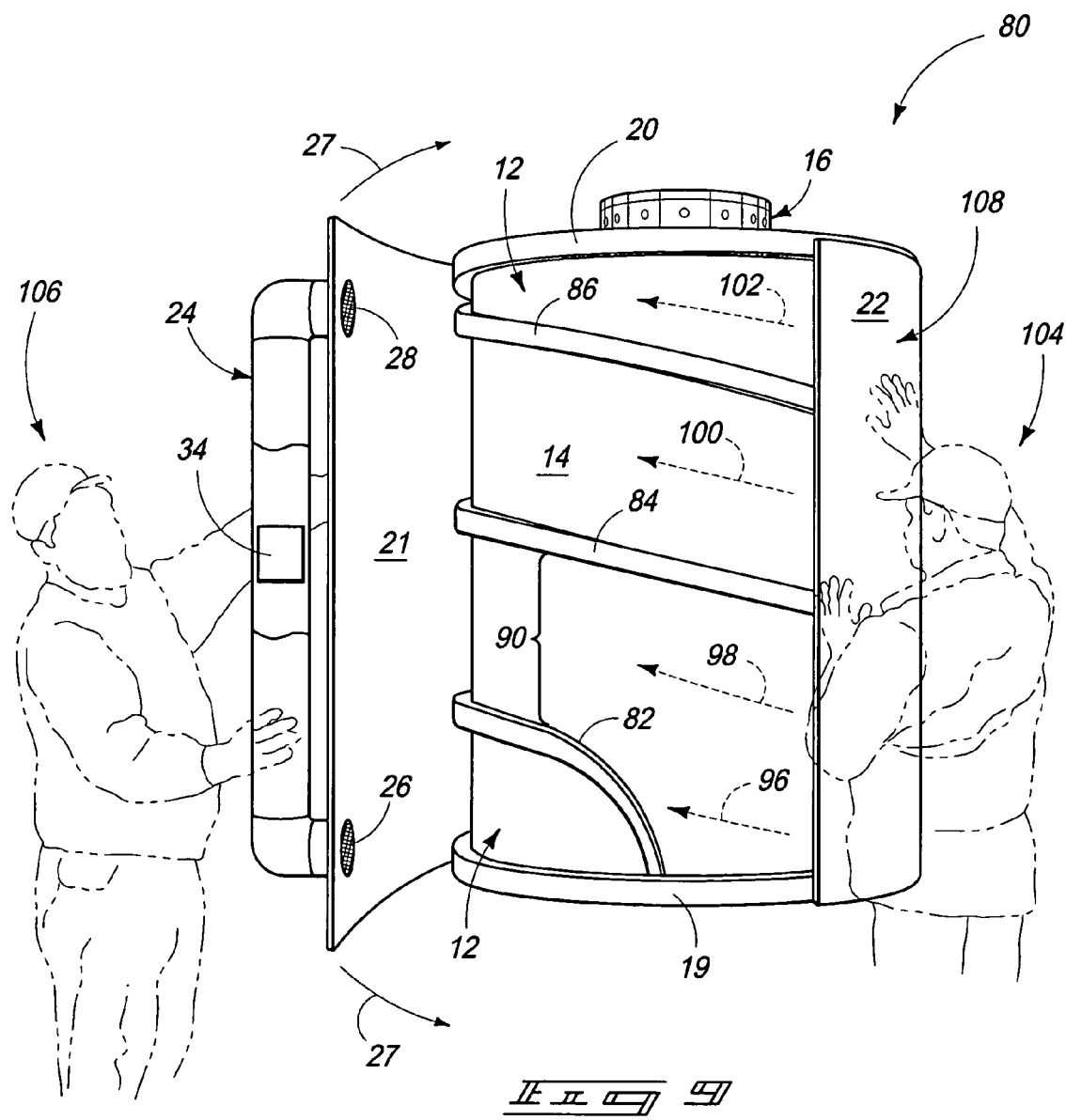
FIG. 9 is a vertical perspective view of the FIG. 8 system at a method step subsequent to the method step of FIG. 8.

FIG. 9 illustrates a method step subsequent to FIG. 8 wherein individuals 104 and 106 are positioning a sheet of flexible material 108 over container 12 contacting respective first and second circumferential rings 19 and 20 to seal respective channels 88, 90, 92 and 94 from the environment. It should be understood respective first and second circumferential rings 19 and 20 could have been secured to sheet 108 instead of tank 12 as shown in FIG. 8. In previous exemplary systems, the sealed void or cavity did not include vanes or baffles 82, 84 and 86, and therefore, the cavity extended between respective first and second circumferential rings 19 and 20. However, vanes or baffles 82, 84 and 86 divide the sealed void or cavity into respective channels 88, 90, 92 and 94 (see FIG. 8) to direct fluid flow in directions 96, 98, 100, and 102 over and against tank 12.

Figure 10:
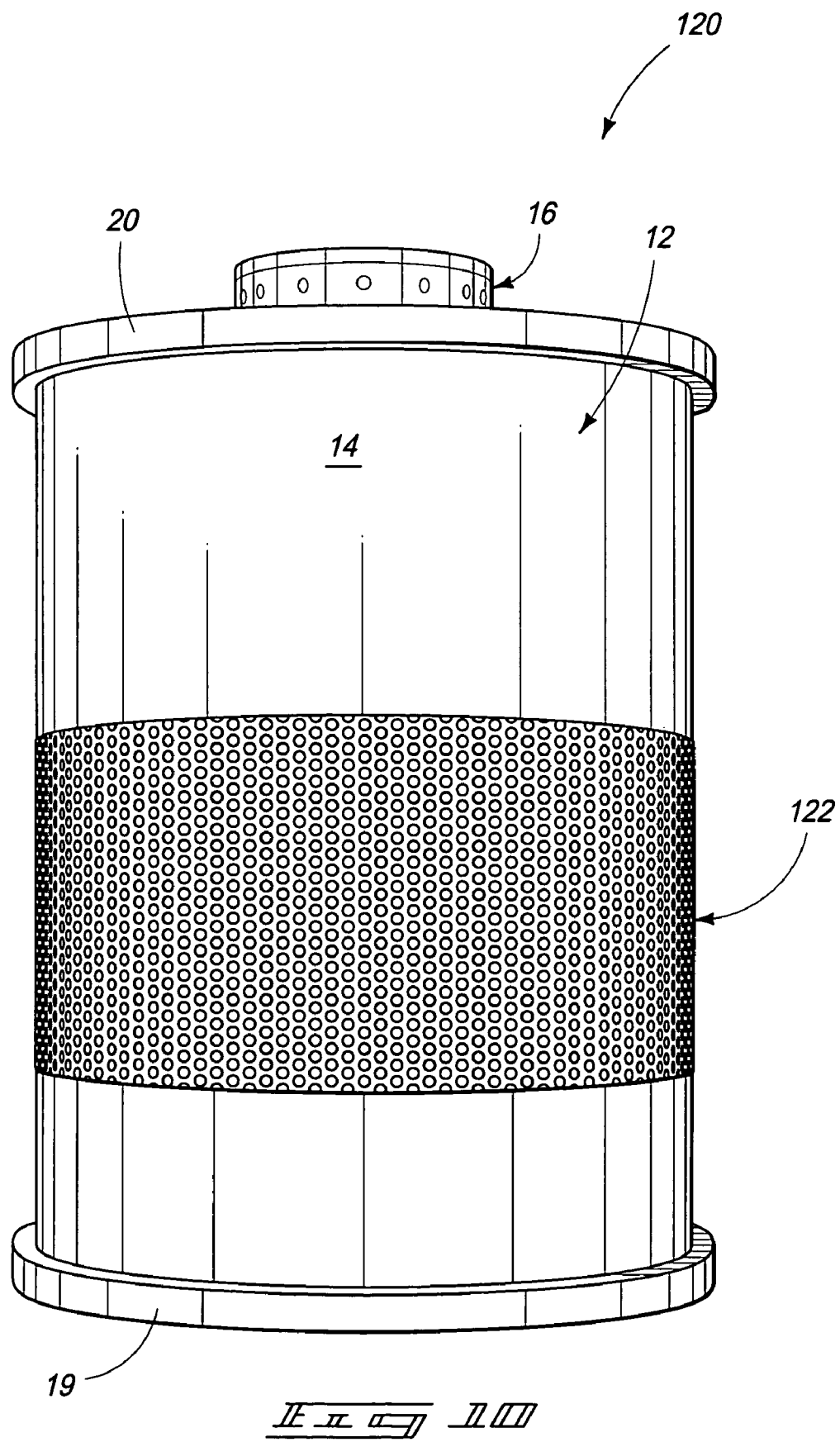
FIG. 10 is a vertical perspective view of a system for regulating the temperature of a tank according to a fourth embodiment of the present invention, with the system illustrated at a method step according to the present invention.

FIG. 10 illustrates a system 120 for regulating the temperature of a container 12 according to another embodiment of the present invention. In describing this embodiment, like numerals from the preceding discussion of the previously described embodiments are utilized where appropriate, with differences being indicated by different numerals. System 120 includes a container 12 having an outer periphery wall 14. First and second circumferential rings 19 and 20 extend outwardly from and encircle the outer periphery wall 14 of container 12. Container or tank 12 further includes a cooling jacket 122, for example, a glycol jacket. A source of cooled glycol, or any other refrigerant, is provided to jacket 122 to cool the contents of tank 12 wherein the glycol is warmed, and the warmed glycol is returned to a heat exchanger or chiller to re-cool the glycol to begin the process again. It should be understood that glycol jackets are routinely made from stainless steel, and therefore, very expensive. To limit expensive, only 25% to 50% of the sidewall surface area of a tank is covered by a glycol jacket.

Figure 11:
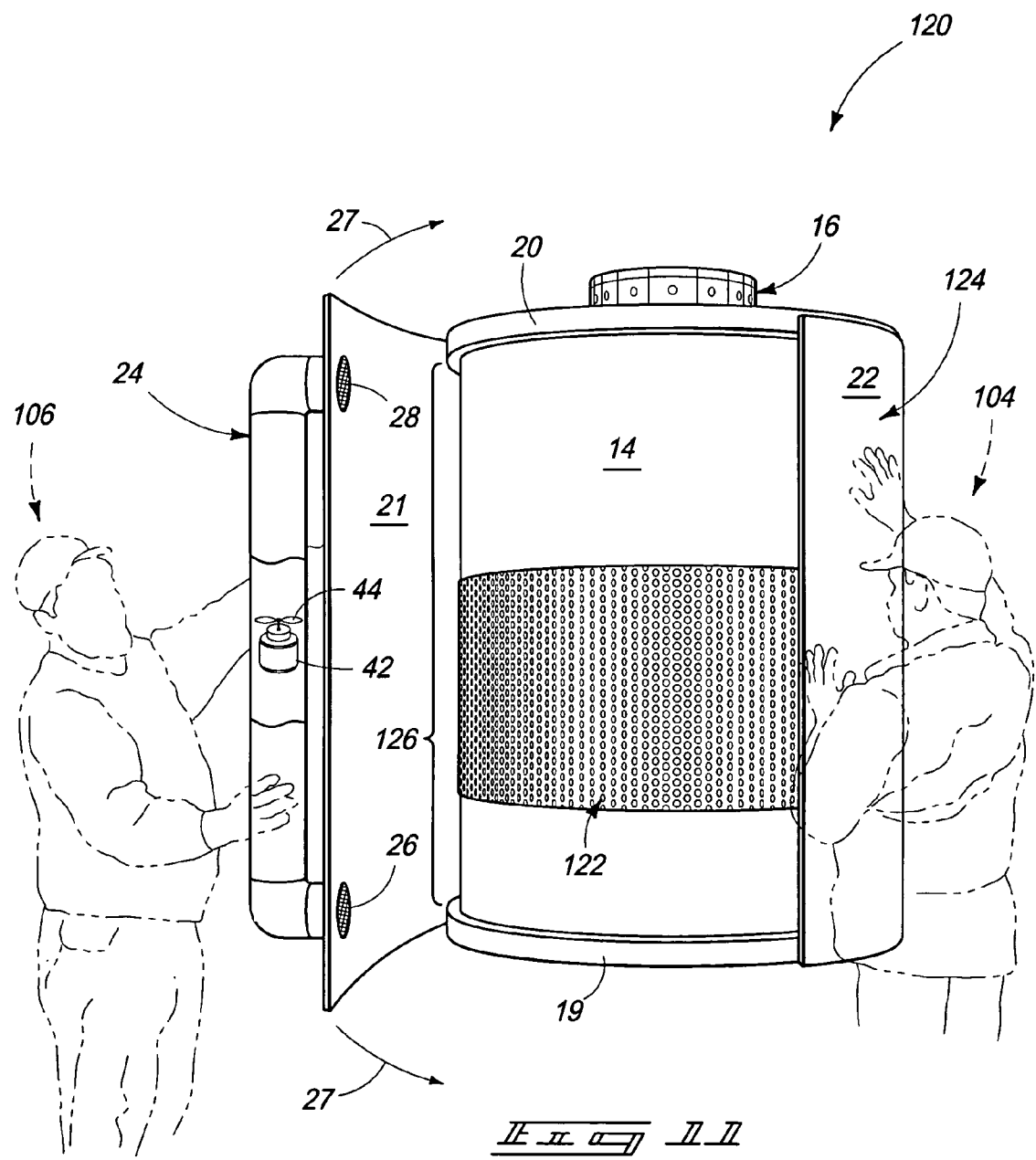
FIG. 11 is a vertical perspective view of the FIG. 10 system at a method step subsequent to the method step of FIG. 10.

FIG. 11 illustrates a method step subsequent to FIG. 10 wherein individuals 104 and 106 are positioning a sheet of flexible material 124 over tank 12 and cooling jacket 122 by securing the sheet 124 to respective first and second circumferential rings 19 and 20. This securing of sheet 124 establishes a sealed void or cavity (not shown by a reference number) between container 12 and sheet 124 that extends between respective first and second circumferential rings 19 and 20. Tube 24 is secured to sheet 124 and includes fan blades 44 driven by an electric motor 44 to force and circulate a fluid medium, such as air, over and around cooling jacket 122 and tank 12. The circulated air will be cooled by the cooling jacket 122 and circulated over substantially an entirety of sidewall dimension 126 of tank 12 along outer periphery wall 14. Consequently, substantially an entirety of sidewall dimension 126 of tank 12 is cooled as opposed to only the portion of tank 12 covered by cooling jacket 122, and therefore, system 120 will greatly enhance and facilitate the cooling effect of cooling jacket 122 on the contents of tank 12 since the entire column or height of contents within the tank 12 are contacting a cooled surface of the tank.

It should be understood that respective first and second circumferential rings 19 and 20 could have been secured to sheet 108 instead of tank 12 as shown in FIG. 10. It should be understood that the sealed void or cavity could include vanes or baffles between respective first and second circumferential rings 19 and 20 to divide the sealed void or cavity into respective channels to further direct fluid flow against and over outer periphery wall 14 and tank 12.

Figure 12:
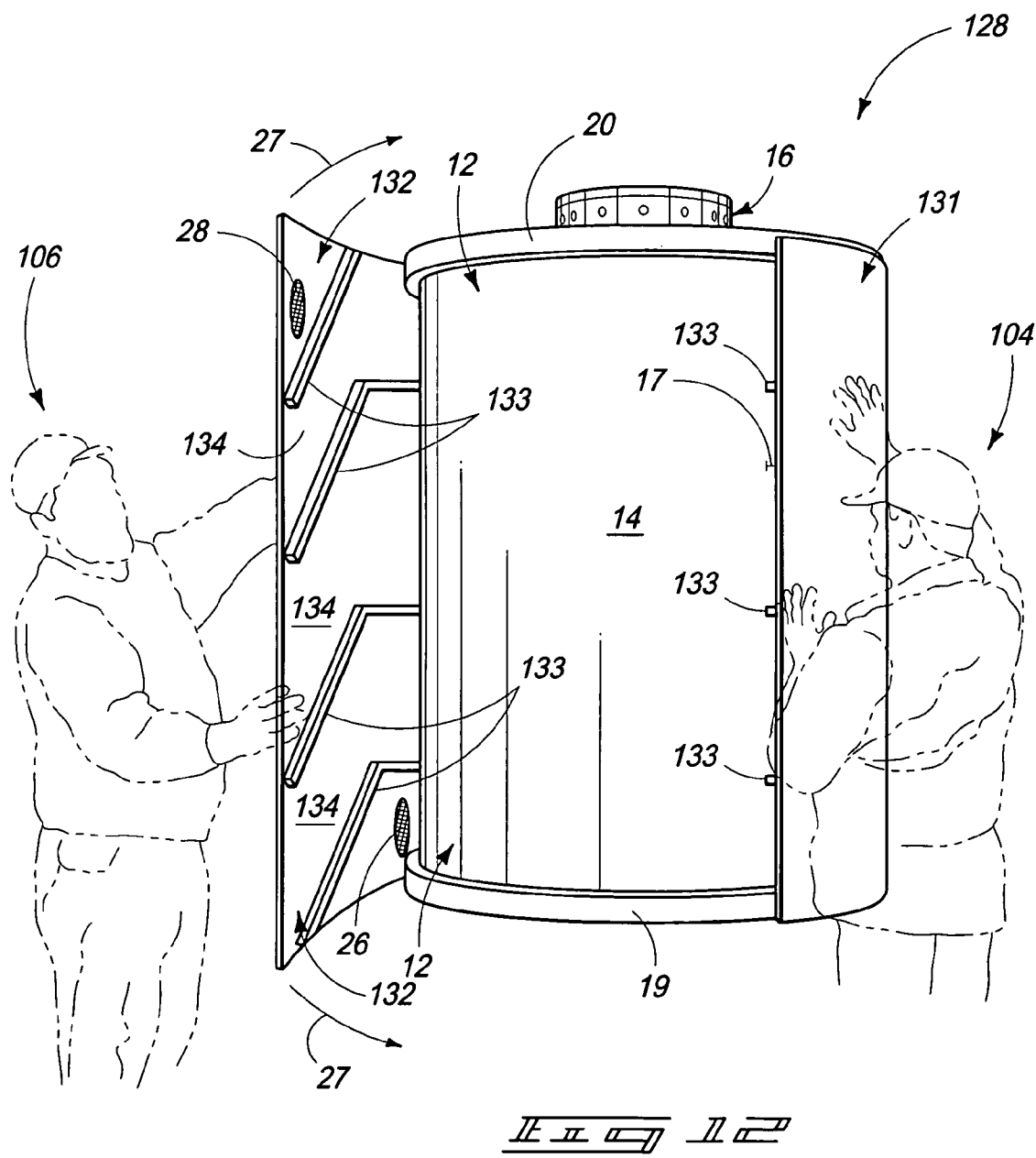
FIG. 12 is a vertical perspective view of a system for regulating the temperature of a tank according to a fifth embodiment of the present invention.

FIG. 12 illustrates a system 128 for regulating the temperature of a container 12 according to another embodiment of the present invention. In describing this embodiment, like numerals from the preceding discussion of the previously described embodiments are utilized where appropriate, with differences being indicated by different numerals. System 128 includes a container 12 having an outer periphery wall 14 with first and second circumferential rings 19 and 20 extending outwardly from and encircling the outer periphery wall 14 of container 12. A sheet of flexible material 131 is provided over container 12 by individuals 104 and 106 to be secured to respective first and second circumferential rings 19 and 20. The sealed void or cavity 17 between container 12 and sheet 131 extends between respective first and second circumferential rings 19 and 20. Sheet 131 includes vanes or baffles 133 secured to the inner wall 132 defining channels 134 for directing a fluid medium around and against outer periphery wall 14 of tank 12 after sheet 131 is in position surrounding tank 12. Vanes 133 could be a continuous length of material extending around tank 12, or discrete segments. Moreover, vanes or baffles 133 could include numerous other patterns or configurations other than the configuration shown, and such exemplary various other patterns are discussed more thoroughly subsequently with reference to FIGS. 25-31.

It should be understood that sheet 131 may or may not be provided as a single continuous and uninterrupted structure. That is, sheet 131 could be provided in discrete segments with one or more segments provided or positioned elevationally over and abutting one or more other segments with all segments over different portions of the surface area of tank 12. Any combination or number of segments of sheet 131 could be used to cover any portion or percentage of the surface area of tank 12. Moreover, each discrete segment of sheet 131 could include any vane or baffle configuration, including no vane or baffle configuration on one or more of the segments. Additionally, one or more discrete segments of sheet 131 could include the same vane or baffle configuration relative the vane or baffle configuration of another one or more discrete segments of sheet 131. Furthermore, one or more discrete segments of sheet 131 could include a different vane or baffle configuration relative the vane or baffle configuration of another one or more discrete segments of sheet 131.

Figure 13:
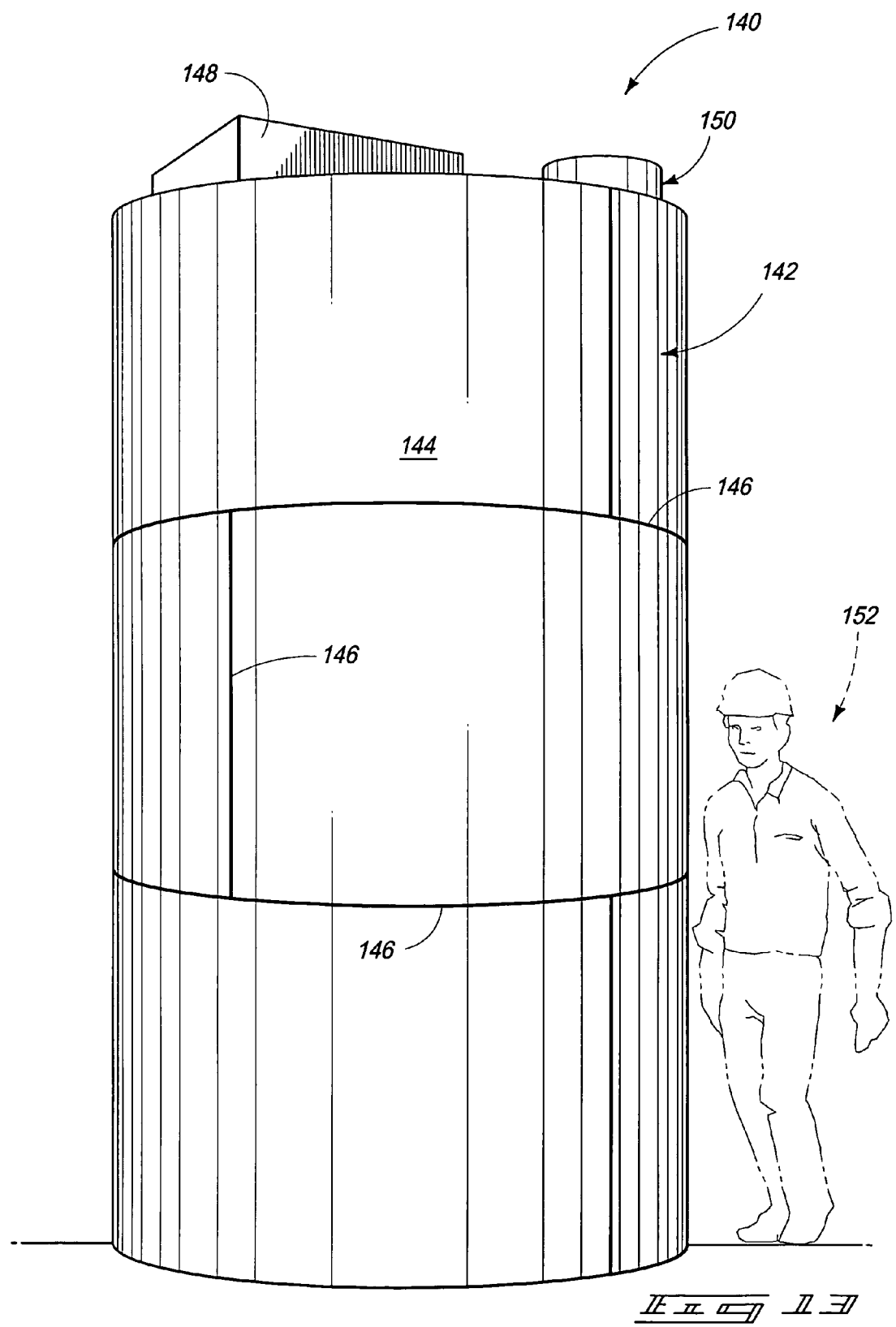
FIG. 13 is a vertical perspective view of a system for regulating the temperature of a tank according to a sixth embodiment of the present invention, with the system illustrated at a method step according to the present invention.

FIG. 13 illustrates a system 140 for regulating the temperature of a stainless steel tank 142 according to another embodiment of the present invention. Stainless steel tank 142 has an outer surface wall or sidewall surface 144 that includes seams 146. This tank 142 is much larger than individual 152 and has a capacity of at least 1000 gallons. A heat exchanger 148 and manway 150 are supported on top of tank 142.

Figure 14:
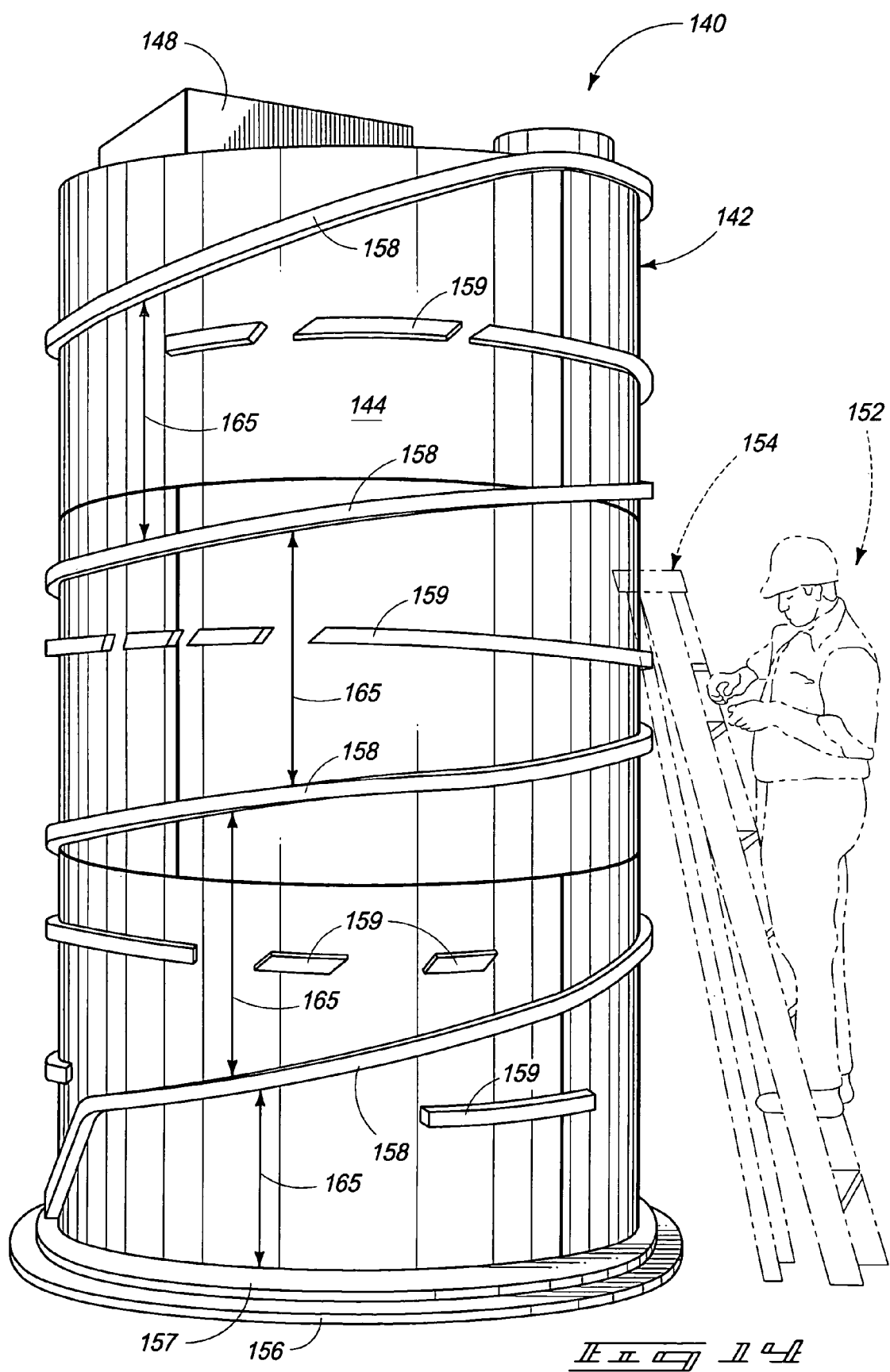
FIG. 14 is a vertical perspective view of the FIG. 13 system at a method step subsequent to the method step of FIG. 13.

FIG. 14 illustrates system 140 with individual 152 on ladder 154 securing vanes 158 on sidewall surface 144 of tank 142. Vanes 158 define channels 165 for fluid flow. With the large surface area of sidewall surface 144, individual 152 additionally secures discrete supports 159 on sidewall surface 144 of tank 142. Supports 159 have the same general thickness of vanes 158. Tank 142 includes an insulative base 156 and lower circumferential ring 157.

Figure 15:
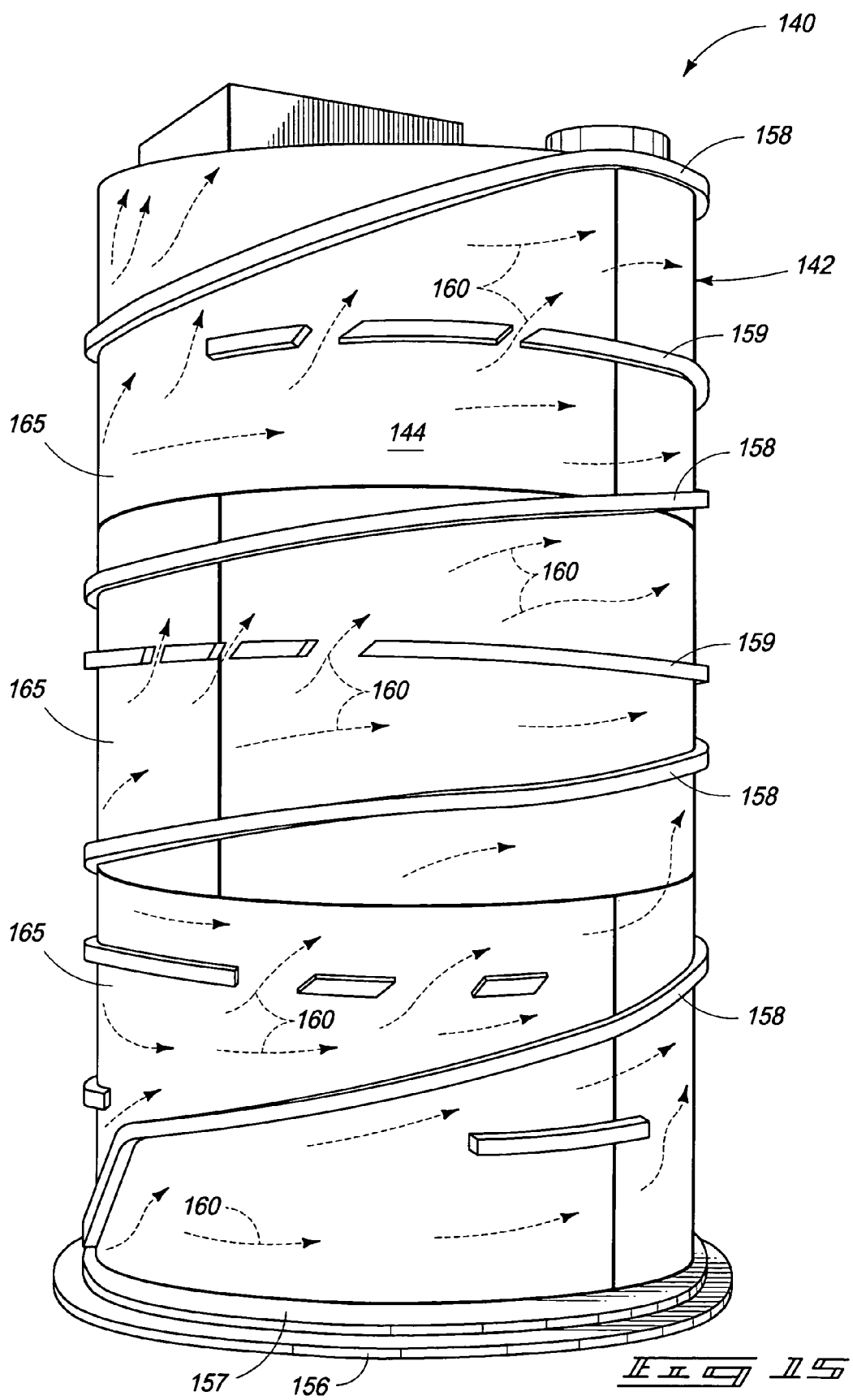
FIG. 15 is a vertical perspective view of the FIG. 14 system illustrating an exemplary fluid flow against the FIG. 14 tank according to an embodiment of the invention.

FIG. 15 illustrates fluid flow 160 through channels 165 and through openings of discrete supports 159.

Figure 16:
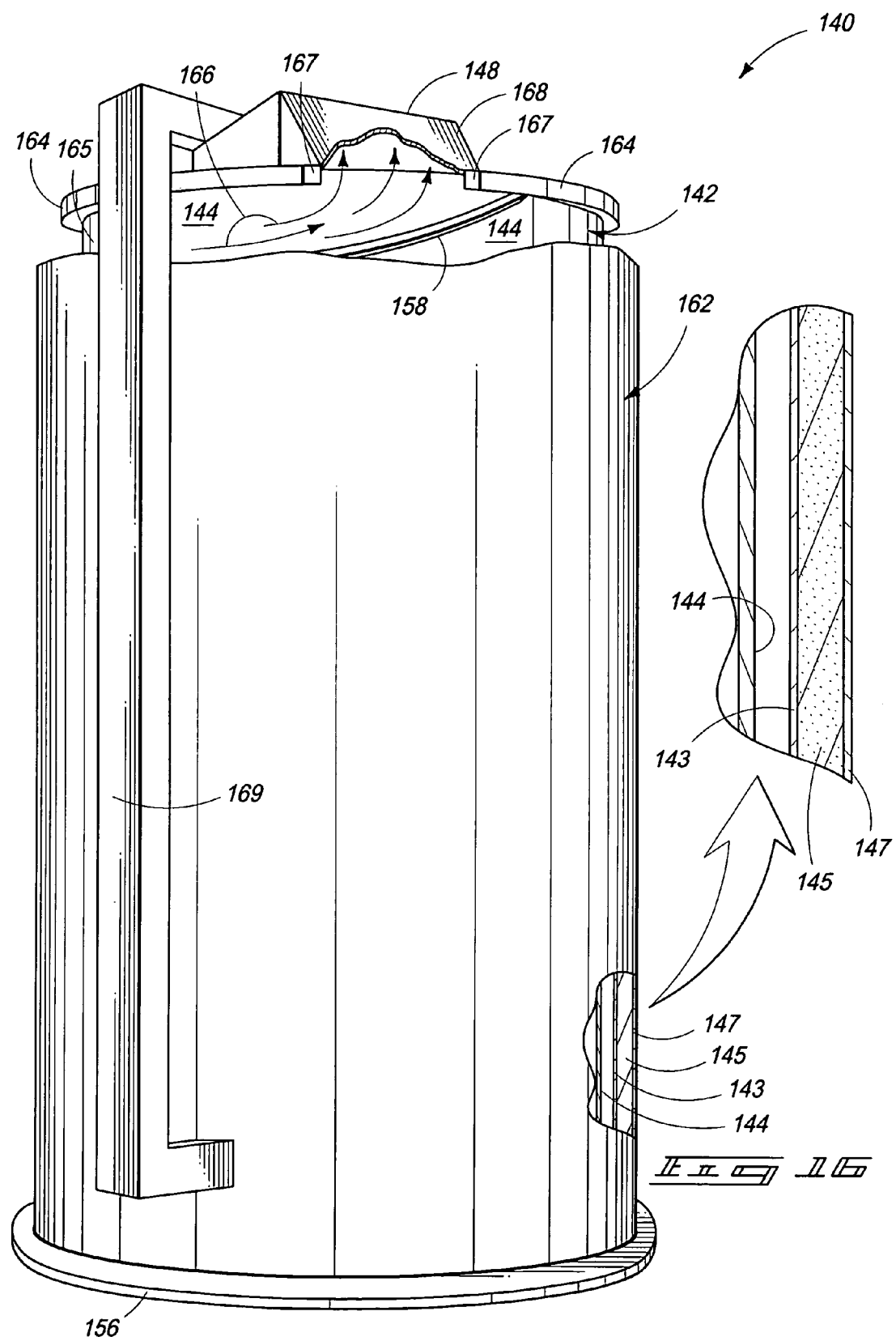
FIG. 16 is a vertical perspective view of the FIG. 15 system at a method step subsequent to the method step of FIG. 15, illustrating two partial cut-away, side views of the FIG. 15 tank.

FIG. 16 illustrates a shell or jacket 162 positioned over substantially an entirety of sidewall surface 144 of tank 142 by securement to vanes 158, supports 159 and circumferential ring 157. Shell 162 is illustrated with a cutaway of a top portion to demonstrate fluid flow 166 through channel 165 into heat exchanger 148. Tank 142 includes a circumferential ring 164 surrounding substantially an upper portion of sidewall surface 144 to receive shell 162 and seal channels 165. Circumferential ring 164 includes an opening 167 between channel 165 and heat exchanger 148 wherein a hood or baffle 168 directs the fluid flow 166 from channel 165 into heat exchanger 148. System 140 further includes a fluid duct 169 to provide fluid communication between heat exchanger 148 and the sealed void or cavity 17 at the lower portion of tank 142. Fluid duct 169 receives fluid flow from heat exchanger 148 and directs the fluid flow through shell 162 into the sealed void or cavity 17 to be re-circulated through channels 165 against the sidewall surface 144 of tank 142. Shell 162 may be constructed to include two or more layers, for example, three layers. Exemplary three layers for shell 162 include an insulative layer 145 sandwiched between two metal layers 143 and 147. Metal layers 143 and 147 may include galvanized steel, for example, 26 gauge. Insulative layer 145 may include foam, for example, Styrofoam.

Figure 17:
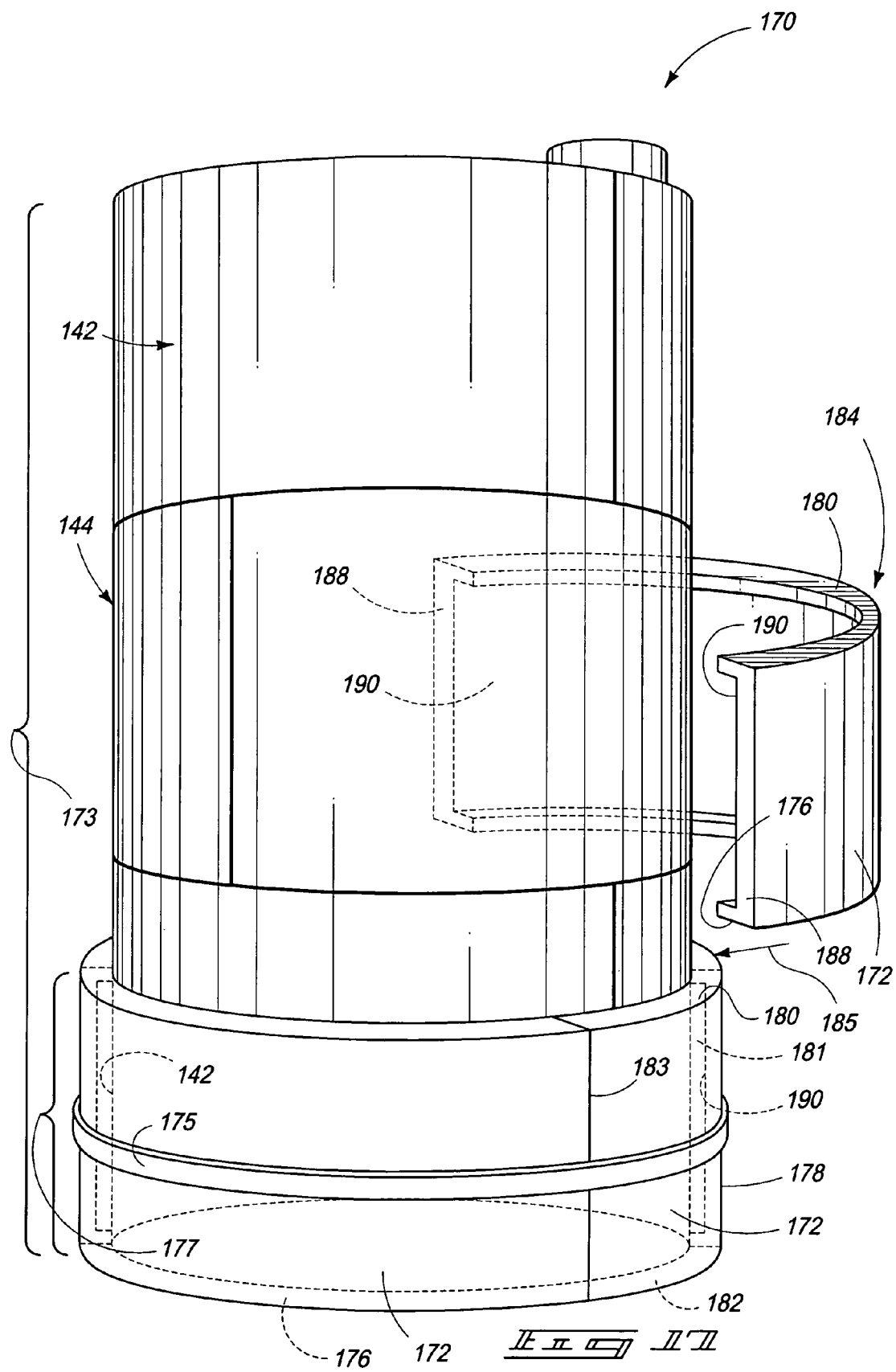
FIG. 17 is a vertical perspective view of a system for regulating the temperature of a tank according to a seventh embodiment of the present invention, the system is illustrated at a method step according to the present invention.

FIG. 17 illustrates a system 170 for regulating the temperature of a container or tank 142 according to another embodiment of the present invention. In describing this embodiment, like numerals from the preceding discussion of the previously described embodiments are utilized where appropriate, with differences being indicated by different numerals. In this embodiment, modular sections 172 are provided to form an enclosure to surround at least a portion of a surface area of tank 142. Tank 142 includes a sidewall surface 144 with an exemplary sidewall length dimension 173. The modular sections 172 are configured to surround the sidewall surface 144 of tank 142 to establish cavities 181 between an inside wall 190 of modular sections 172 and sidewall surface 144 of tank 142. Exemplary material for modular sections 172 include rigid insulating material covered with a durable material such as plastic or metal. Alternatively, the modular sections 172 include Styrofoam covered with sheet metal, for example, 22 gauge enameled sheet metal.

The modular sections 172 can be designed to surround a tank 142 having any cross-sectional configuration, for example a circle, square and rectangle to list only a few. For example, the illustrated tank 142 is shaped generally as a cylinder, and therefore, has a circular cross section. Accordingly, an exemplary modular section 172 is configured to have a curved configuration. The exemplary modular sections 172 illustrated are configured having semicircle cross sections wherein a first pair 178 of modular sections 172 are positioned to surround an entirety of a circumference of a lowermost portion of the sidewall surface 144 area. It should be understood that the curved configuration of the exemplary modular section 172 could have any dimension, for example, the modular section 172 could have a quarter of a circular cross section wherein four modular sections 172 would be positioned to surround an entirety of a circumference of a portion of the sidewall surface 144 area.

Still referring to FIG. 17, each modular section 172 has opposite terminal edges 188 (shown in modular section 172 spaced from tank 142), and lower curved edges 176 opposite curved upper curved shelf or ridge 180. The first pair 178 of modular sections 172 are shown positioned surrounding a lowermost portion of the sidewall surface 144 area wherein the two terminal edges 188 of each modular section 172 are positioned abutting one another to form seam line 183. A retainer device, for example, a strap 175 holds the modular sections 172 in place and may be used permanently or to maintain the relative position of the two modular sections 172 for alternative securement, for example, by screws. Secured together in this fashion, the first pair 178 of modular sections 172 form cavity 181 that is substantially sealed from the environment and surrounds the lowermost portion of the sidewall surface 144 area. That is, two modular sections 172 secured around a circumferential portion of the sidewall surface 144 of tank 142 will form a sealed region or cavity 181 with that circumferential portion of the sidewall surface 144 of tank 142.

The illustrated modular sections 172 have a sidewall length 177 that approximates a quarter of the sidewall length 173 of tank 142, and therefore, if the entire sidewall length 173 is to be enclosed, four modular sections 172 would be stacked on top of one another to equal the sidewall length 173 of tank. Moreover, in this example, eight modular sections 172 forming four pairs are used to enclose substantially an entirety of the surface area of sidewall surface 144 of tank 142 (see FIG. 18). It should be understood that modular sections 172 could include any sidewall length, for example, wherein smaller lengths would result in more modular sections 172 being used to enclose the sidewall surface area of the exemplary tank 142 illustrated in FIG. 17.

Still referring to FIG. 17, the first pair 178 of modular sections 172 are positioned over the lowermost sidewall surface 144 of tank 142 to form a continuous curved upper shelf or ridge 180 to receive and support a second pair 184 of modular sections 172. One modular section 172 of the second pair 184 is shown in FIG. 17 and is to be moved in direction 185. The lower curved edge 176 of the second pair 184 of modular section 172 pair is to be positioned upon the upper shelf 180 of the first pair 178 of modular sections for support. It should be understood that any portion of the area of sidewall surface 144 for tank 142 could be enclosed by modular sections 172, for example, 25% or 50% of the sidewall surface 144 area.

Figure 18:
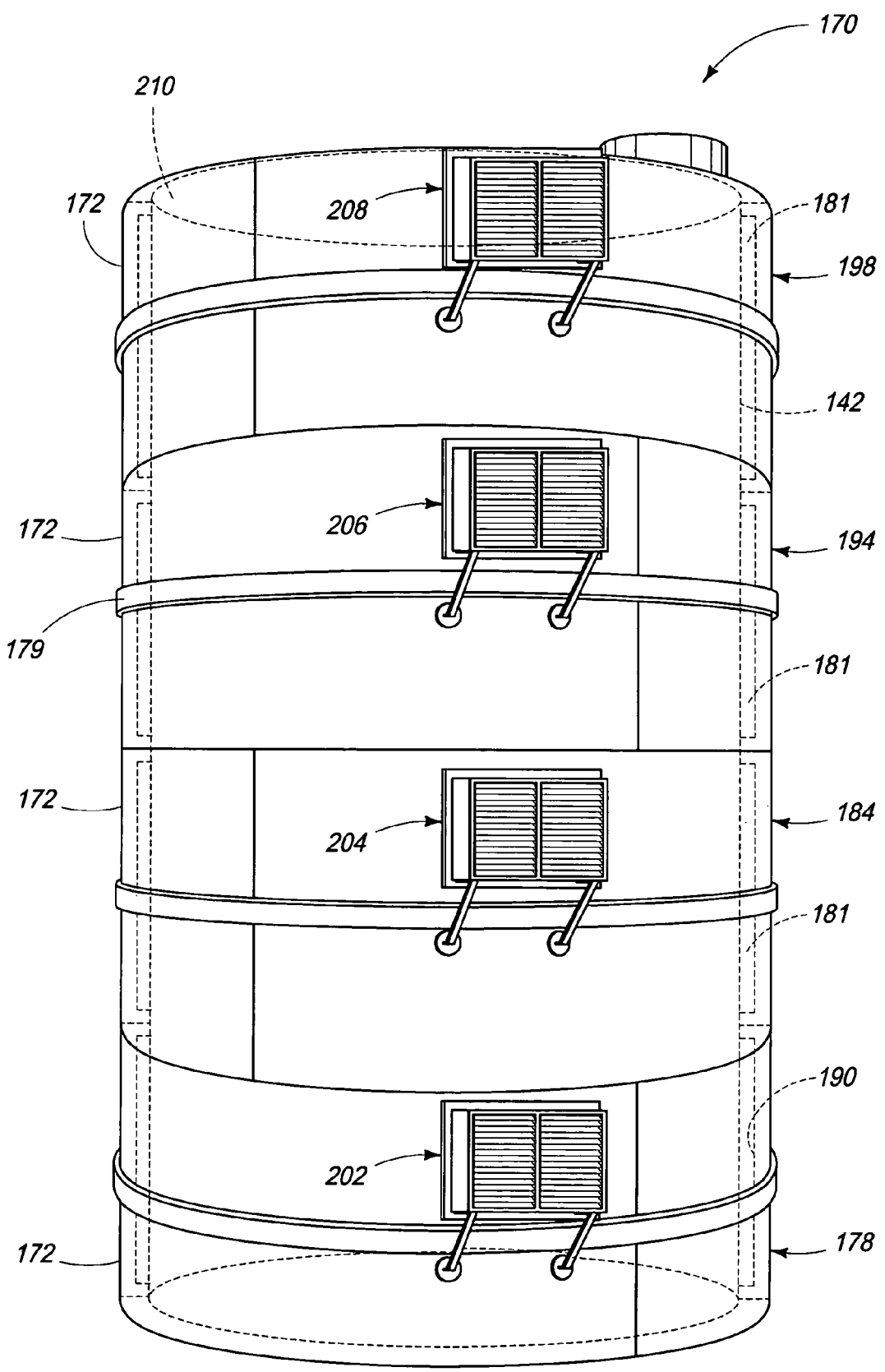
FIG. 18 is a vertical perspective view of the FIG. 17 system at a processing step subsequent to the method step of FIG. 17.

Referring to FIG. 18, tank 142 is illustrated with substantially an entirety of sidewall surface 144 enclosed by respective pairs 178, 184, 194 and 198 of modular sections 172. Each respective pair of modular sections 172 has dedicated a single heat exchanger in fluid communication with respective cavities 181 formed by the respective pairs of modular sections 172. Exemplary respective heat enchangers are air conditioners 202, 204, 206 and 208 provided to supply a fluid medium into the respective cavities 181 formed by the respective pairs of modular sections 172 wherein the temperature of each respective portion of the sidewall surface 144 of tank 142 is regulated. It should be understood that each modular section 172 may include a vane or baffle configuration within the cavity 181 to establish channels. The baffle configuration in each respective modular section may be the same, or different, relative to one another.

Figure 19:
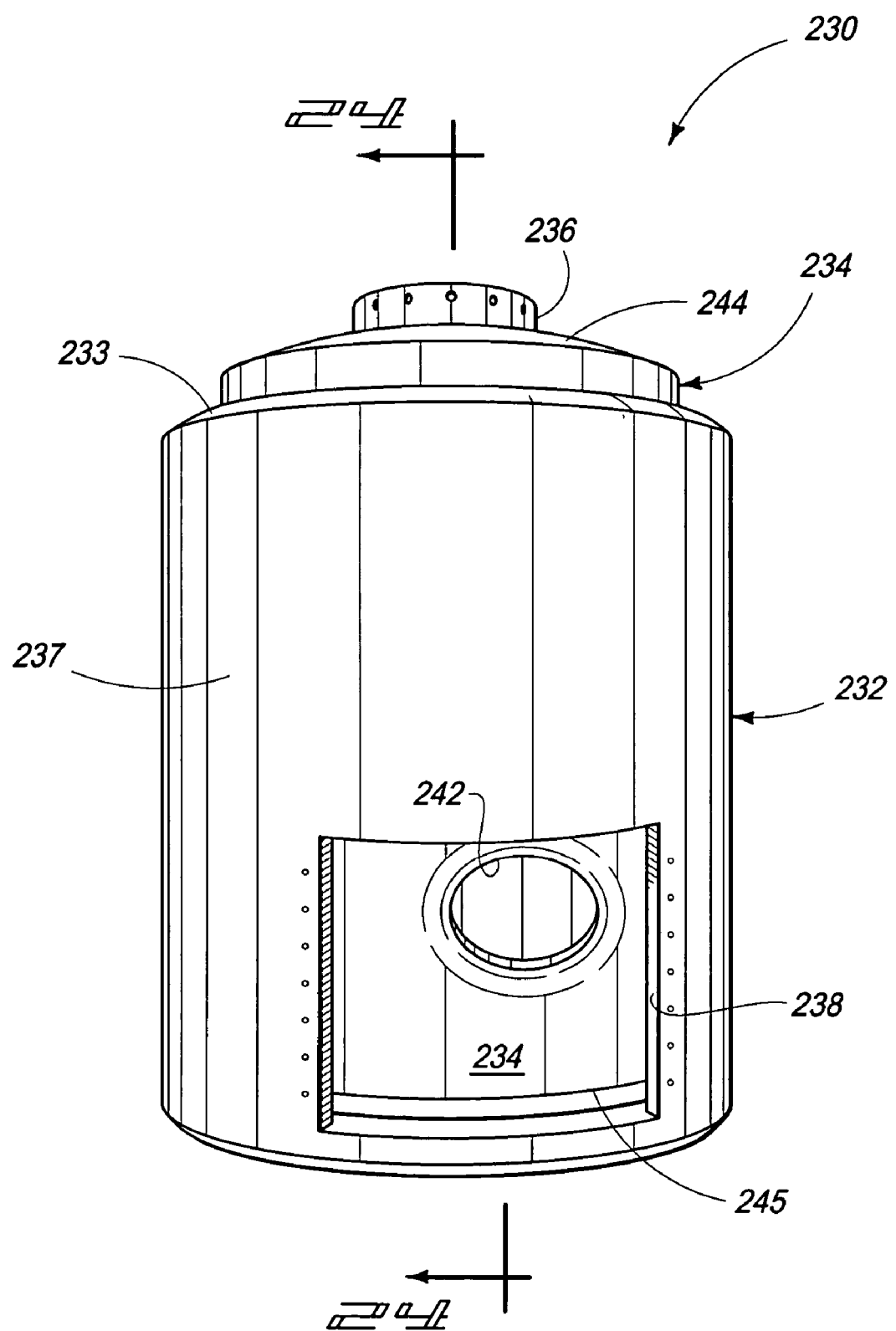
FIG. 19 is a vertical perspective view of a system for regulating the temperature of a tank according to an eighth embodiment of the present invention, and the system is illustrated at a method step according to the present invention.

FIG. 19 illustrates a system 230 for regulating the temperature of a container or tank 234 according to another embodiment of the present invention. FIG. 19 illustrates tank 234 being slipped into or received by a device or structure configured as a shell 232. Tank 234 has a top wall that includes a first manway 236 which functions as an ingress and egress for contents to be stored and processed in tank 234. Shell 232 has an opening 238 to allow access to a second manway 242 formed in tank 234 after tank 234 is finally positioned in shell 232. Second manway 242 functions as an ingress and egress for individuals. In this view of FIG. 19, tank 234 has not completely descended into shell 232, and therefore, a bottom edge 245 of a bottom wall (shown in FIG. 20 as numeral 246) of tank 234 can be seen through opening 238 of shell 232. In this exemplary embodiment, shell 232 has a cylindrical shape with a sidewall surface 237 defining a circular cross section. A circular rim 233 intersects the sidewall surface 237 at an upper portion of shell 232 and defines an opening 280 (shown in FIG. 20) to receive tank 234. It should be understood that shell 232 may be formed without opening 280 at the top of shell 232 and define an opening in the bottom wall of shell 232 wherein shell 232 is slipped over a tank.

Figure 20:
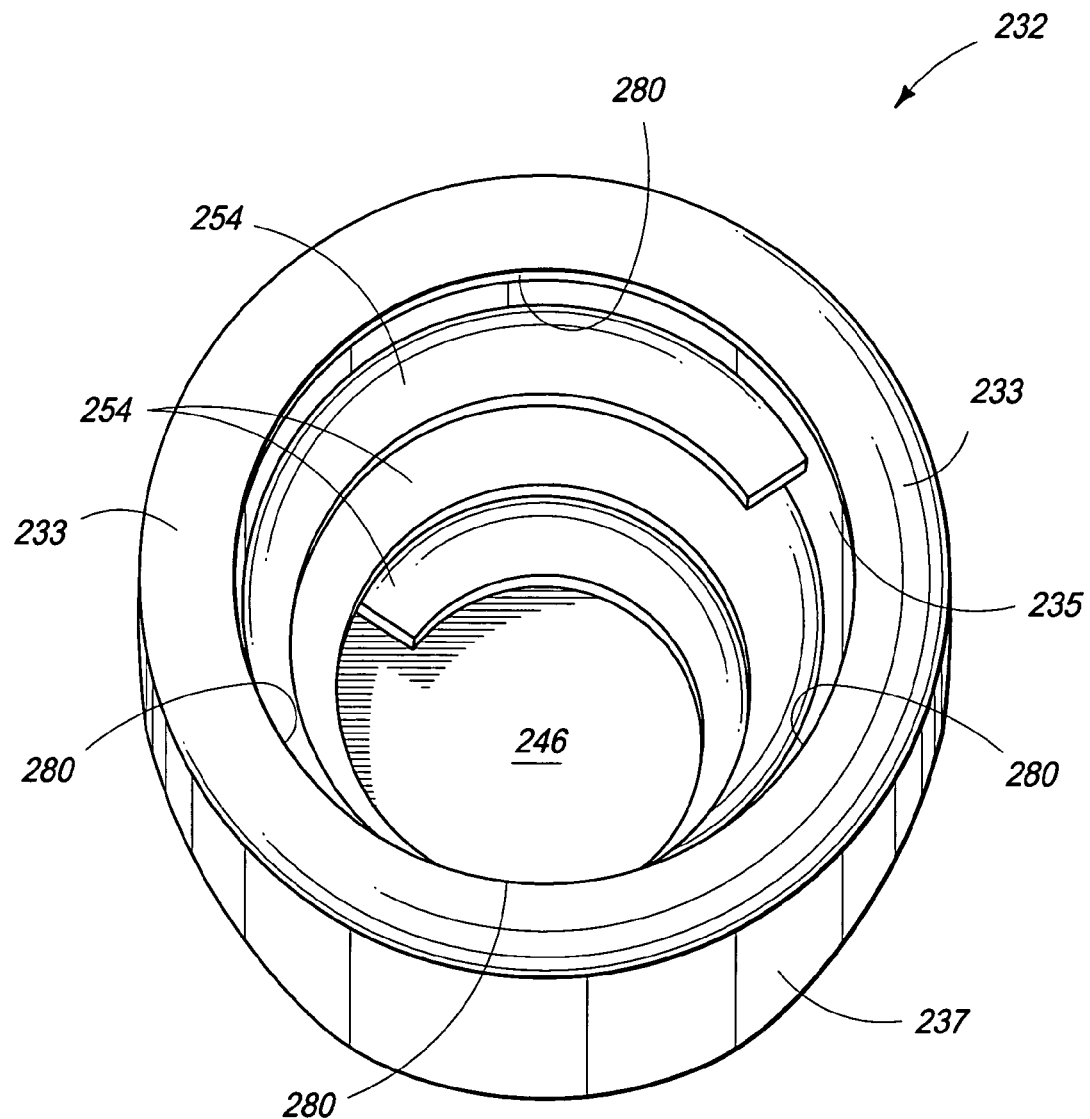
FIG. 20 is a perspective view taken from above of an exemplary device according to the present invention of the FIG. 19 system.

FIG. 20 represents a view from the top of shell 232 through opening 280 wherein bottom wall 246 is illustrated and vanes or baffles 254 are illustrated extending from an inner wall 235 of shell 232. It should be understood that bottom wall 246 of shell 232 could be covered with an insulative layer of material (not shown). Vanes or baffles 254 define channels (276 shown in FIG. 24) to direct fluid flow wherein specific configurations of baffles 254 and channels are more thoroughly discussed with respect to FIGS. 25-31.

Figure 21:
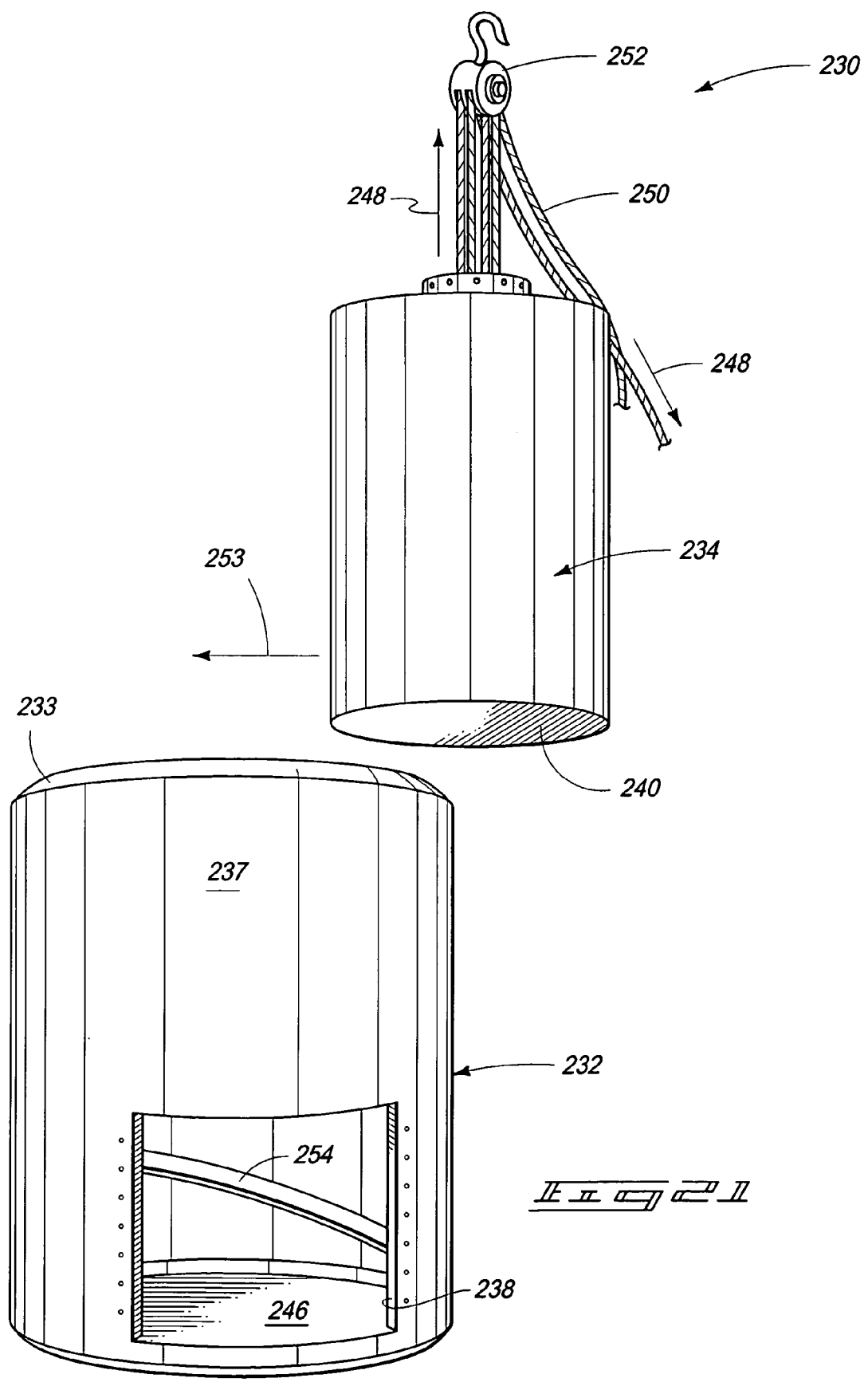
FIG. 21 is a vertical perspective view of the FIG. 19 system illustrated at a method step according to the present invention.

Referring to FIG. 21, an exemplary preliminary method step of forming system 230 is shown according to an embodiment of the present invention. Tank 234 is hoisted or lifted with a rope 250 and pulley 252 configuration by pulling rope 250 in direction of 248 to move a bottom wall 240 of tank 234 elevationally above circular rim 233 of shell 232. Tank 234 may then be moved in direction 253 to center tank 234 over opening 280 of shell 232.

Figure 22:
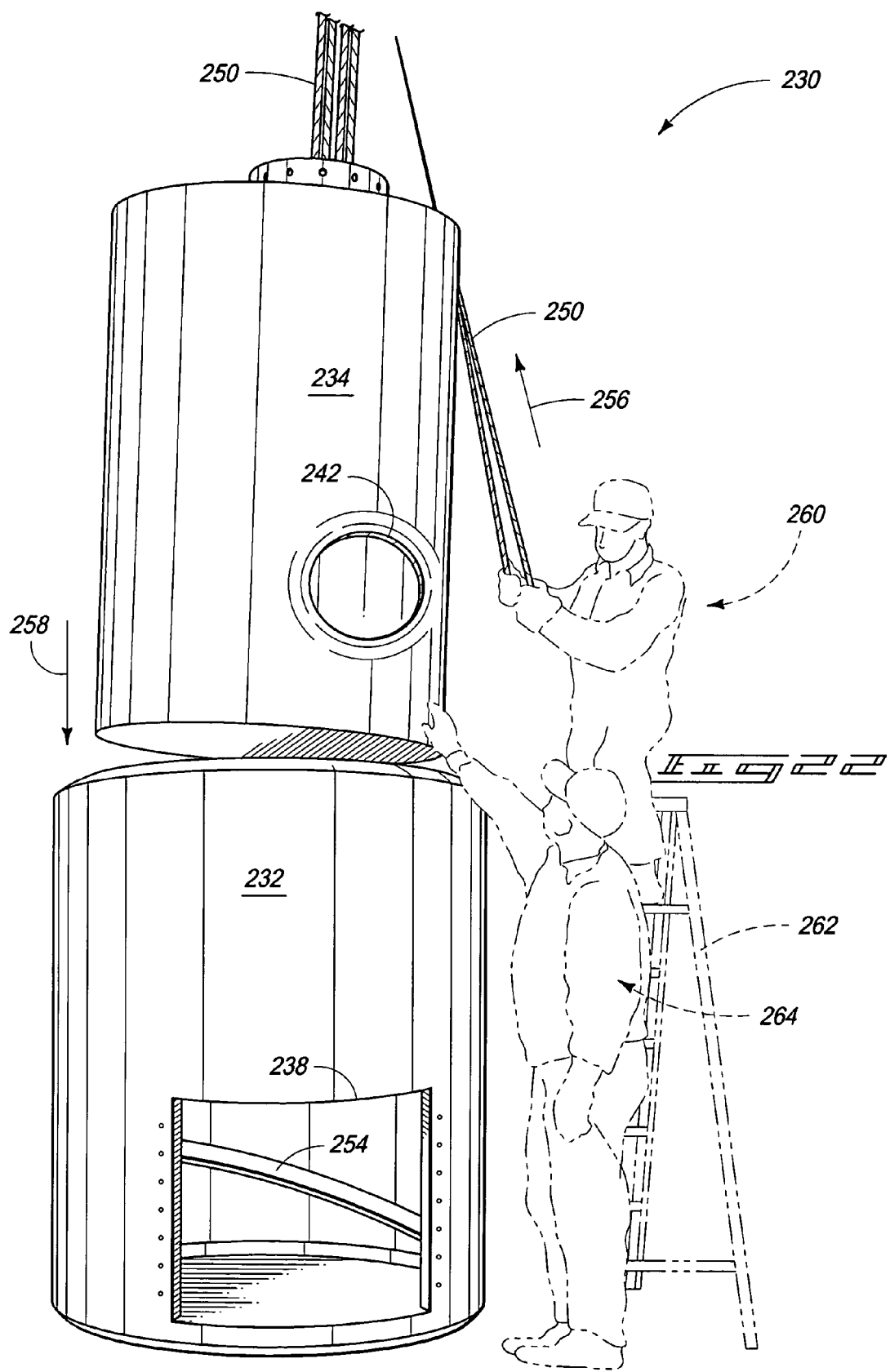
FIG. 22 is a vertical perspective view of the FIG. 21 system at a method step subsequent to the method step of FIG. 21.

FIG. 22 illustrates a method step of forming system 230 subsequent to that method step of FIG. 21. Individuals 260 (on ladder 262) and 264 are positioning tank 234 directly over shell 232 and beginning to lower tank 234 in direction 258 into shell 232 by moving rope 250 in direction 256.

Figure 23:
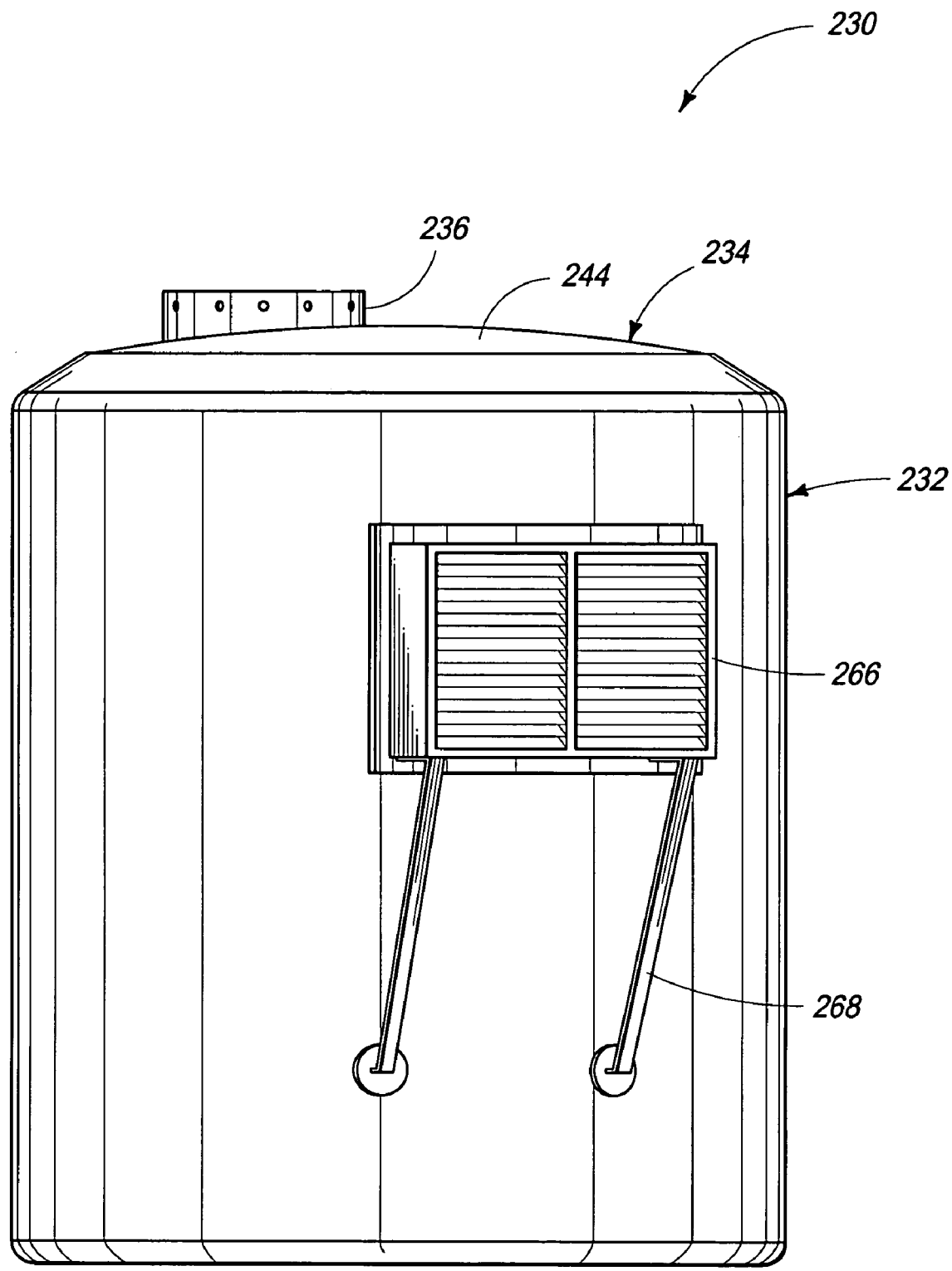
FIG. 23 is a vertical perspective view of the FIG. 22 system at a method step subsequent to the method step of FIG. 22.

FIG. 23 illustrates a method step of forming system 230 subsequent to that method step of FIG. 22 wherein tank 234 is positioned and settled into shell 232. From this view, heat exchanger 266 is illustrated extending from sidewall surface 237 of shell 232 and supported by arms 268. Heat exchanger 266 provides a fluid medium at a modified temperature into channels 276 (shown in FIG. 24) and against tank 234 to regulate the temperature of tank 234.

Figure 24:
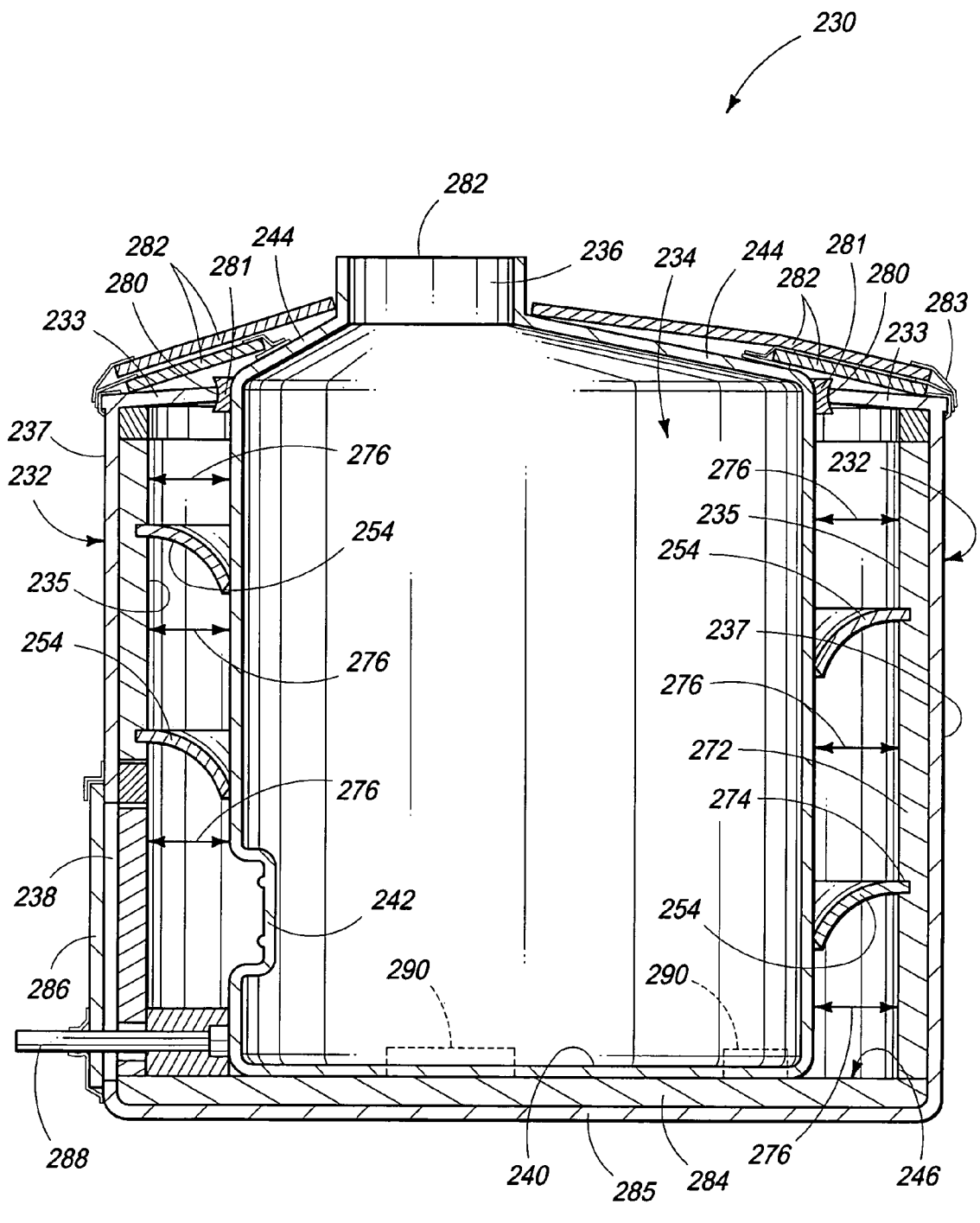
FIG. 24 is a vertical perspective sectional view of the FIG. 19 system taken along line 24-24 of FIG. 19.

FIG. 24 is a sectional view of system 230 taken along line 24-24 of FIG. 19 with the difference being FIG. 24 includes more details and has tank 234 settled in a final position within shell 232. The bottom wall 246 of shell 232 includes two layers, an inner insulative layer 284 over an outer lowermost wall 285. Bottom wall 240 of tank 234 rests on inner insulative layer 284 of bottom wall 246 of shell 232 wherein tank 234 is centered on the inner insulative layer 284 within shell 232 by centering blocks 290. Inner wall 235 of shell 232 is an insulative layer 272 extending along the inside of sidewall surface 237 of shell 232. Grooves or slots 274 are formed in insulative layer 272 and receive end portions of vanes 254 to secure the vanes 254 in the insulative layer 272 to shell 232. It should be understood that vanes 254 are, in one exemplary embodiment, a continuous structure that extend in a spiral pattern around tank 234, and are shown as sectionals because FIG. 24 is a sectional view. Alternatively, vanes 254 could be discrete structures and not continuous. Fluid flow channels or cavities 276 are defined between tank 234, inner wall 235 and respective vanes 254 wherein bottom wall 246 of shell 232 and circular rim 233 of shell 232 finalize the enclosure to substantially seal the fluid flow channels or cavities 276 from the environment.

Still referring to FIG. 24, opening 280 of shell 232 which receives tank 234 is plugged with insulative material 281 between circular rim 233 and tank 234. Insulative panels 282 extend between circular rim 233 of shell 232 and top surface 244 of tank 234 to further insulate upper portions of tank 234 and shell 232. Insulative panels 282 are secured to tank 234 and shell 232 by adhesives 283, for example, tape. Second manway 242 of tank 234 is covered (not shown) to seal the second manway 242 from channel 276. Opening 238 of shell 232 is covered by door 286 seal opening 238 from the environment. A drain pipe 288 extends from tank 234 through door 286 of shell 232. It should be understood that channels 276 have a width dimension defined between tank 234 and inner wall 235 of 232. However, vanes 254 extend outwardly from inner wall 235 at a greater distance than the width dimension of channels 276. Consequently, upon dropping tank 234 into opening 280 of shell 232, outer sidewalls of tank 234 contact the respective vanes 254 to curve the vanes 254 downward as shown. The curved configuration of vanes 254 enhances sealment of respective channels 276.

It should be understood that shell 232 may or may not be provided as a single continuous and uninterrupted structure. That is, shell 232 could be provided in discrete segments with one or more segments provided or positioned elevationally over and abutting one or more other segments with all segments over different portions of the surface area of tank 234. Any combination or number of segments of shell 232 could be used to cover any portion or percentage of the surface area of tank 234. Moreover, each discrete segment of shell 232 could include any vane or baffle configuration, including no vane or baffle configuration on one or more of the segments. Additionally, one or more discrete segments of shell 232 could include the same vane or baffle configuration relative the vane or baffle configuration of another one or more discrete segments of shell 232. Furthermore, one or more discrete segments of shell 232 could include a different vane or baffle configuration relative the vane or baffle configuration of another one or more discrete segments of shell 232.

It should be understood that previous embodiments of the present invention represented systems configured without vanes or baffles, systems configured with vanes or baffles on a sheet of material or shell to be positioned over or wrapped around a tank, and systems configured with vanes or baffles on a tank. It should be understood that exemplary embodiments of the present invention include any combination of these systems. For example, an exemplary embodiment of the present invention includes a system wherein a sheet of material or shell is configured with vanes or baffles. In the same exemplary system, a tank is included to be enclosed by the sheet or shell wherein the tank is also configured with vanes or baffles. The sheet or shell is positioned over or wrapped around the tank to provide the vanes or baffles of the sheet or shell to be in a complementary configuration with the vanes or baffles of the tank. The complementary configuration of the baffles or vanes could include numerous configurations. For example, after positioning the sheet or shell over and around the tank, a exemplary complementary configuration of the baffles or vanes could include one set of baffles or vanes positioned in between the other set of baffles or vanes. Alternatively, after positioning the sheet or shell over and around the tank, a exemplary complementary configuration of the baffles or vanes could include one set of baffles or vanes positioned in alignment over the other set of baffles or vanes.

FIGS. 25-31 represent different embodiments of devices for regulating the temperature of structures such as tanks, and the contents thereof, according to the present invention. Each embodiment of FIGS. 25-31 represent various fluid flow configurations, with some embodiments representing various fluid flow configurations in channels defined by various vane or baffle configurations. It should be understood that each embodiment of the devices disclosed by FIGS. 25-31 may be used with any of the previously discussed embodiments of the systems disclosed by FIGS. 2-24.

Moreover, each device disclosure of FIGS. 25-31 are represented as planar rectangular shapes having two parallel sides with smaller length dimensions than two other parallel sides. It should be understood that the device disclosures of FIGS. 25-31 represent three dimensional configurations or structures which can be visualized by imagining moving the smaller sides of the rectangular shapes toward each other until an enclosed structure is formed.

In one exemplary embodiment for the device disclosures of FIGS. 25-31, the imagined movement of the smaller sides of the rectangular shapes is to be upward from the page toward each other to form, for example, a sheet of material such as sheet 131 disclosed in the exemplary embodiment of FIG. 12. Accordingly, in this exemplary embodiment, the structure and representations inside each rectangular shape of the device disclosures of FIGS. 25-31 represent the inner wall or surface 132 of sheet 131.

In another exemplary configuration for the device disclosures of FIGS. 25-31, the imagined movement of the smaller sides of the rectangular shapes is to be upward from the page toward each other to form, for example, a shell such as shell 232 disclosed in the exemplary embodiment of FIGS. 19-24. Accordingly, in this exemplary embodiment, the structure and representations inside each rectangular shape of the device disclosures of FIGS. 25-31 represent the inner wall or surface 235 of shell 232.

In another exemplary configuration for the device disclosures of FIGS. 25-31, the imagined movement of the smaller sides of the rectangular shapes is to be downward from the page (opposite direction to the upward movement discussed with the previous two embodiments) toward each other, to form, for example, tank 12 disclosed in the exemplary embodiment of FIGS. 8-9. Accordingly, in this exemplary embodiment, the structure and representations inside each rectangular shape of the device disclosures of FIGS. 25-31 represent the outer periphery wall 14 of tank 12 with modifications. It should be understood that for this exemplary embodiment, that is, FIGS. 25-31 representing the outer periphery wall 14 of tank 12, the device disclosures of FIGS. 25-31 are modified not to include the openings disclosed as inlets and outlets and the doors representing access to manways. It should be understood that for this exemplary embodiment, FIGS. 25-31 are intended to show exemplary vane and baffle constructions over the outer periphery wall 14 of tank 12.

Figure 25:
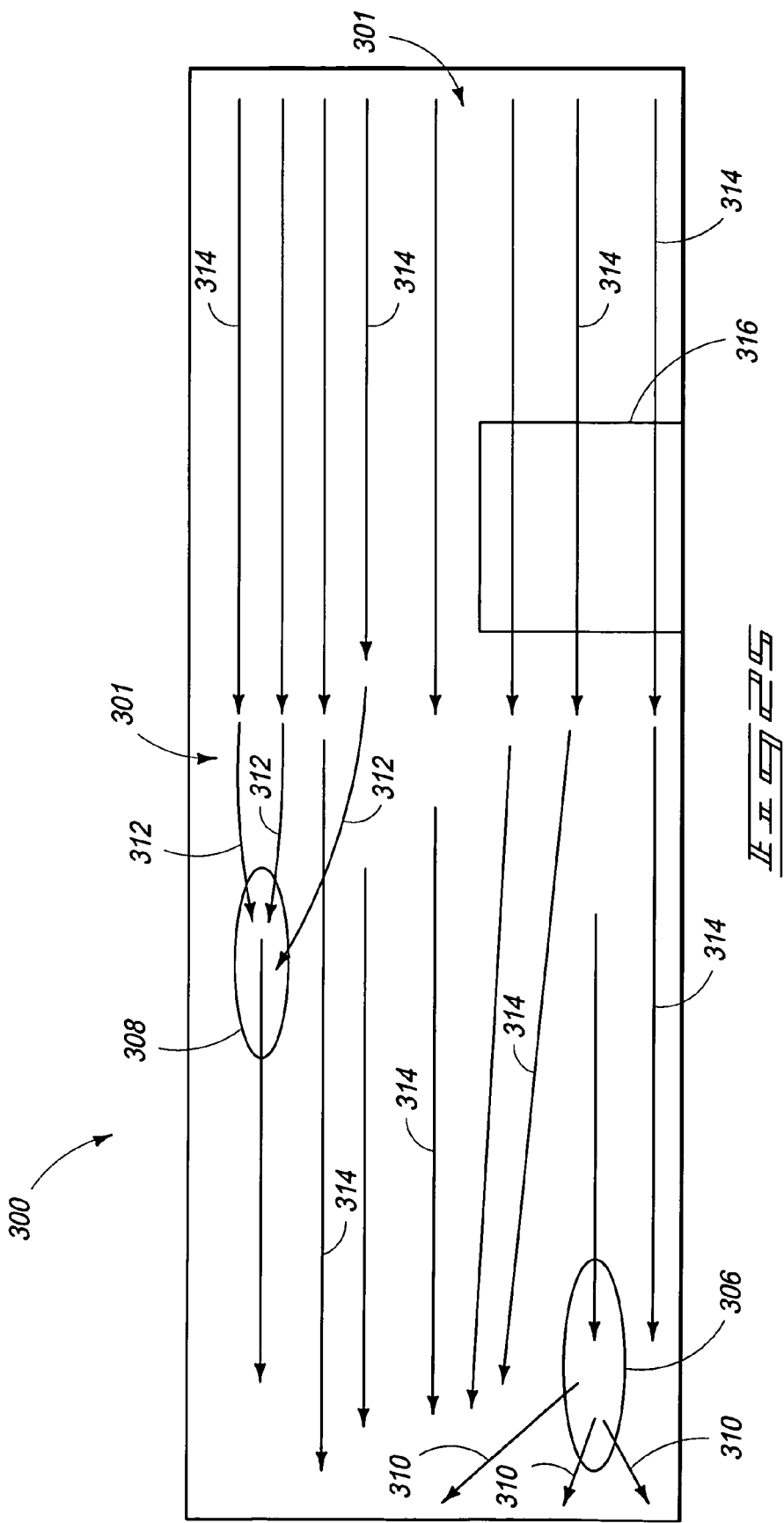
FIG. 25 is a simplified elevational view of an unrolled inner surface of a device for regulating the temperature of a tank according to one embodiment of the present invention.

FIG. 25 is an exemplary embodiment of a device 300 for regulating the temperature of structures such as tanks, and the contents therein, according to the present invention. An exemplary interior 301 of device 300 represents the inner wall or surface of a sheet or shell to be wrapped around and sealed over a tank, and in this embodiment, is completely devoid of vanes or baffles. Device 300 includes an inlet 306, an outlet 308 and door 316 for access to a manway in a tank. Direction lines 310 represent the direction of fluid flow of a fluid medium from a heat exchanger and entering device 300 through inlet 306. Direction lines 312 represent the direction of fluid flow of the fluid medium to the heat exchanger and exiting device 300 through outlet 308. The fluid medium is heated or cooled and re-circulated to enter device 300 through inlet 306.

Direction lines 314 represent the direction of the balance of the fluid flow of the fluid medium between the inlet 306 and outlet 308 and against the tank wherein the fluid continues to flow and circulate through device 300 and the heat exchanger to continue the regulation of temperatures of the tank by the heat transfer relationship between the fluid medium and tank outer peripheral wall.

Figure 26:
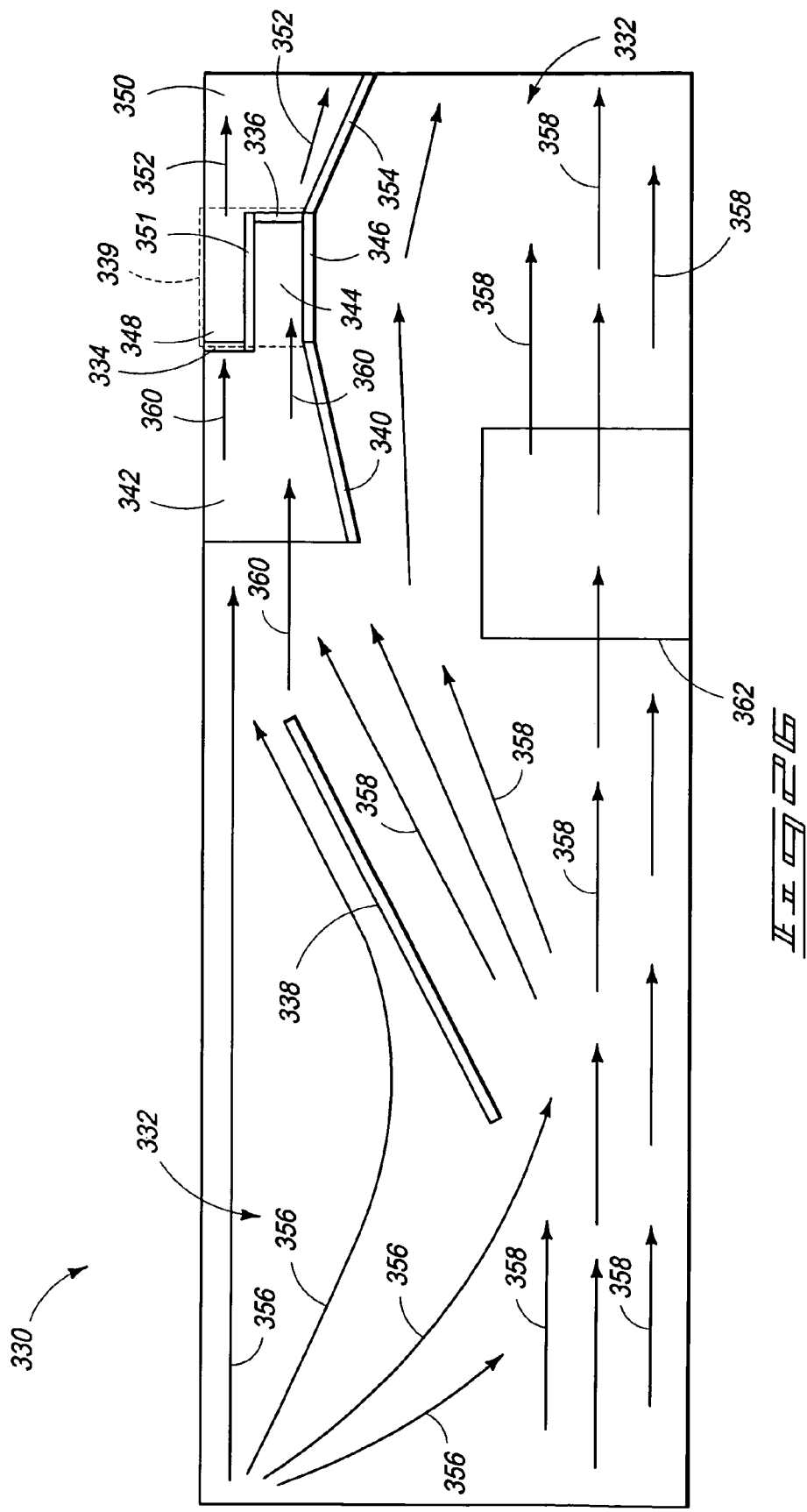
FIG. 26 is a simplified elevational view of an unrolled inner surface of a device for regulating the temperature of a tank according to another embodiment of the present invention.

FIG. 26 is an exemplary embodiment of a device 330 for regulating the temperature of structures such as tanks, and the contents therein, according to the present invention. An exemplary interior 332 of device 330 represents the inner wall or surface of a sheet or shell to be wrapped around and sealed over a tank. Device 330 includes a vane 340 to define a region 342 which facilitates the fluid flow 360 through outlet 344 and exiting device 330 into a heat exchanger 339, wherein outlet 344 is defined by baffles 351, 336 and 346. Device 330 includes an inlet 348 which allows fluid flow 352 to enter device 330 from the heat exchanger 339 into region 350 which facilitates fluid flow 356 to be dispersed over the tank throughout device 330, wherein inlet 348 is defined by baffles 334 and 351. Device 330 includes vane 338 to facilitate further dispersal of fluid flow 358 and includes a door 362 for access to a manway of the tank. The fluid continues to flow and circulate through device 330 and heat exchanger 339 to continue the regulation of temperatures of the tank by the heat transfer relationship between the fluid medium and tank outer peripheral wall. Please note the inlet 348 is directly over and adjacent outlet 344 wherein both are separated by baffles 334, 351 and 336.

Figure 27:
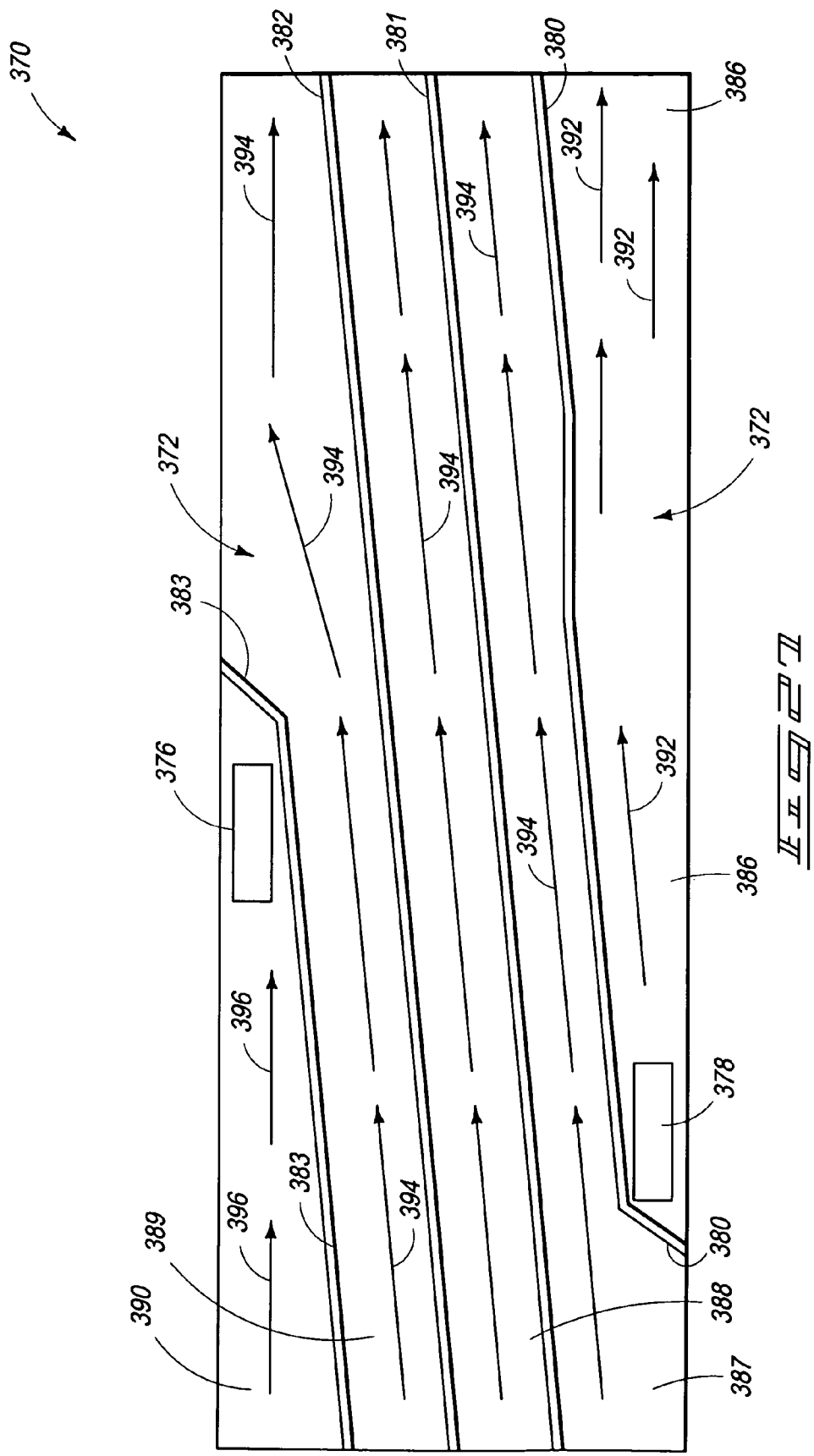
FIG. 27 is a simplified elevational view of an unrolled inner surface of a device for regulating the temperature of a tank according to yet another embodiment of the present invention.

FIG. 27 is an exemplary embodiment of a device 370 for regulating the temperature of structures such as tanks, and the contents therein, according to the present invention. An exemplary interior 372 of device 370 represents the inner wall or surface of a sheet or shell to be wrapped around and sealed over a tank. Device 370 includes an outlet 376 in region 390 defined by vane 383 which receives fluid flow 396 moving through outlet 376 into a heat exchanger wherein a fluid medium is heated or cooled and circulated to reenter device 370 through inlet 378. Fluid flow 392 from inlet 378 enters region 386 defined by vane 380 to move generally in a linearly fluid flow 394 spiraling up against the tank through respective channels 387, 388 and 389 wherein each channel is defined by respective vanes or baffles 380, 381 and 382 extending generally in a helical configuration. Fluid flow 394 continues and reenters region 390 as fluid flow 396 to again exit device 370 through outlet 376 to reenter the heat exchanger for continued re-circulation through device 370 to continue the regulation of temperatures of the tank by the heat transfer relationship between the fluid medium and tank outer peripheral wall.

Figure 28:
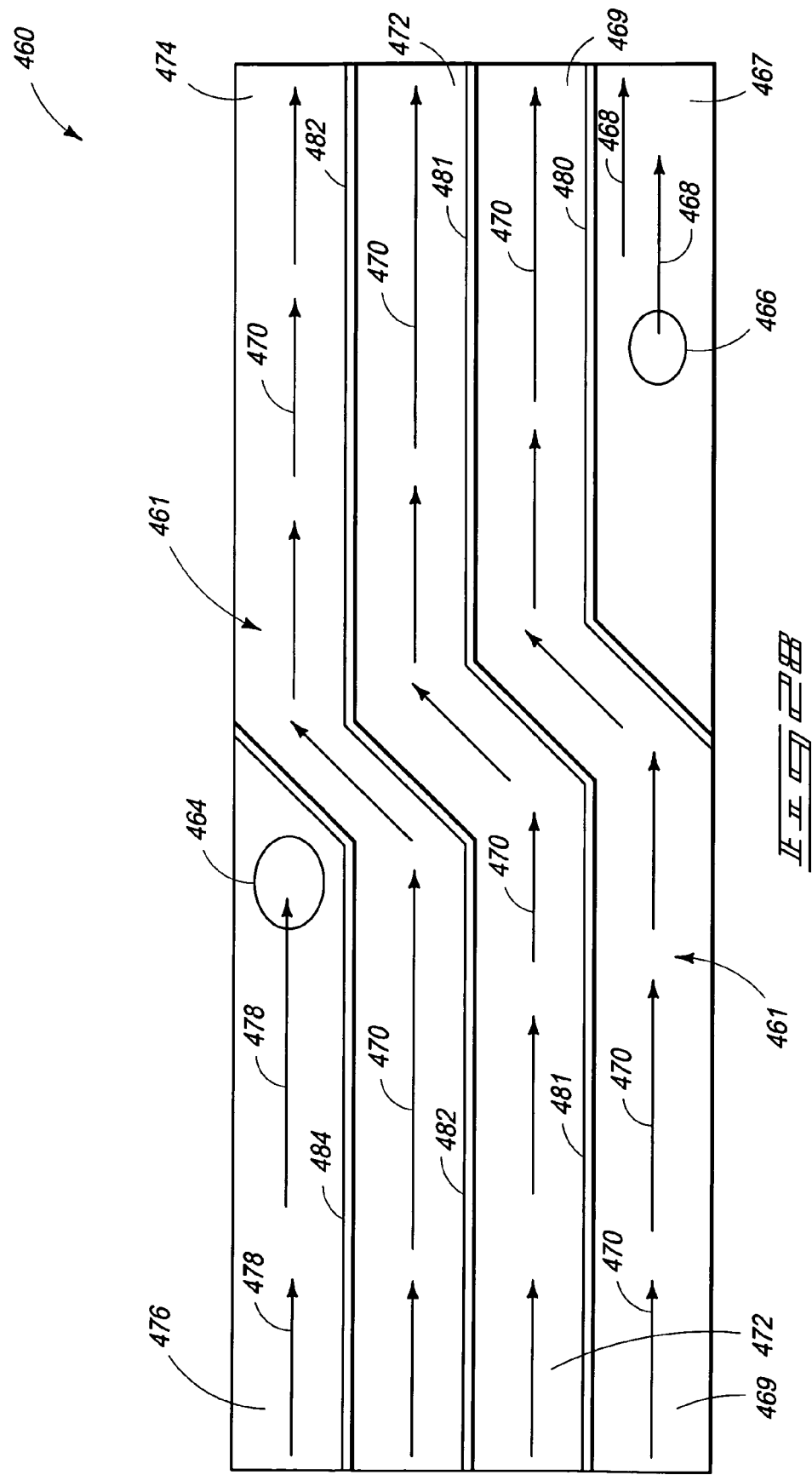
FIG. 28 is a simplified elevational view of an unrolled inner surface of a device for regulating the temperature of a tank according to even another embodiment of the present invention.

FIG. 28 is an exemplary embodiment of a device 460 for regulating the temperature of structures such as tanks, and the contents therein, according to the present invention. An exemplary interior 461 of device 460 represents the inner wall or surface of a sheet or shell to be wrapped around and sealed over a tank. Device 460 includes an outlet 464 in region 476 defined by vane 484 which receives fluid flow 478 moving through outlet 464 into a heat exchanger wherein a fluid medium is heated or cooled and circulated to reenter device 460 through inlet 466. Fluid flow 468 from inlet 466 enters region 467 defined by vane 480 to move generally in a linearly fluid flow 470 spiraling up against the tank through respective channels 469, 472 and 474 having a center step configuration and defined by respective vanes or baffles 481 and 482 extending generally horizontally with a center step configuration. Fluid flow 470 continues and reenters region 476 as fluid flow 478 to again exit device 460 through outlet 464 to reenter the heat exchanger for continued re-circulation through device 460 to continue the regulation of temperatures of the tank by the heat transfer relationship between the fluid medium and tank outer peripheral wall.

FIG. 29 is an exemplary embodiment of a device 410 for regulating the temperature of structures such as tanks, and the contents therein, according to the present invention. An exemplary interior 411 of device 410 represents the inner wall or surface of a sheet or shell to be wrapped around and sealed over a tank. Device 410 includes an outlet 415 laterally adjacent and separated from an inlet 414 by baffle 417. Fluid flow 448 moves from region 447 through outlet 415 into a heat exchanger 412 wherein a fluid medium is heated or cooled and circulated to reenter device 410 through inlet 414. Fluid flow 418 enters device 410 from inlet 414 and enters region 416 defined by vane 453 and continues to move as fluid flow 432 into channel 428 defined by vane 454 wherein fluid flow 433 turns in region 434 to continue in channel 427 defined by vanes 454 and 457 wherein fluid flow 432 moves in an opposite direction with respect to the direction of fluid flow 432 in channel 428. Fluid flow 432 continues into channel 425 defined by vanes 452 and 453. Fluid flow 432 continues into channel 438 defined by vanes 451 and 450, and continues to move until fluid flow 440 reaches region 442 and turns to continue as fluid flow 432 moving in channel 444 defined by vane 450 wherein fluid flow 432 moves in an opposite direction in channel 444 relative the direction in channel 438. Fluid flow 432 continues to enter channel 424 defined by vanes 451 and 452 and continues into channel 426 defined by vanes 453 and 457. Fluid flow 432 continues and reenters region 447 as fluid flow 448 to again exit device 410 through outlet 415 and reenters the heat exchanger 412 to start the re-circulation process wherein continued re-circulation through device 460 continues the regulation of temperatures of the tank by the heat transfer relationship between the fluid medium and tank outer peripheral wall. It should be noted that in this exemplary embodiment, the fluid flow in adjacent channels is in opposite directions relative to one another.

FIG. 30 is an exemplary embodiment of a device 490 for regulating the temperature of structures such as tanks, and the contents therein, according to the present invention. An exemplary interior 500 of device 490 represents the inner wall or surface of a sheet or shell to be wrapped around and sealed over a tank. Device 490 includes an outlet 494 laterally adjacent and separated from an inlet 493 by baffle 510. Fluid flow 507 moves from region 506 through outlet 494 into a heat exchanger wherein a fluid medium is heated or cooled and circulated to reenter device 490 through inlet 493. Fluid flow 496 enters device 490 from inlet 493 and enters region 495 defined by vanes 509 and 510 wherein fluid flow 497 turns in region 495 to continue into region 492 (also defined by vanes 509 and 510) as fluid flow 498 which moves in an opposite direction with respect to the direction of fluid flow 496 in region 495. Fluid flow 498 continues into channel 499 defined by vanes 502 and 508 until the flow reaches and turns in region 505 as fluid flow 501 which enters channel 504 as fluid flow 498 moving in the opposite direction as the flow direction in channel 499. Fluid flow 498 continues into channel 491 defined by vanes 508 and 509 until fluid flow reenters region 506 as fluid flow 507 to again exit device 490 through outlet 494 and reenters the heat exchanger to start the re-circulation process wherein continued re-circulation through device 490 continues the regulation of temperatures of the tank by the heat transfer relationship between the fluid medium and tank outer peripheral wall. It should be noted that in this exemplary embodiment, the fluid flow in adjacent channels is generally in opposite directions relative to one another.

FIG. 31 is an exemplary embodiment of a device 512 for regulating the temperature of structures such as tanks, and the contents therein, according to the present invention. Exemplary respective interiors 519, 520, 521, and 522 of device 512 represent the inner wall or surface of four respective and discrete sectionals of a sheet or shell to be wrapped around and sealed over a tank. As sealed, respective interiors 519, 520, 521, and 522 also represent respective channels 519, 520, 521, and 522 of device 512 wherein the channels are defined by respective baffles or vanes 534, 535 and 536. Periphery edges 533 and 537 are also provided with baffles (not shown) to seal device 512 to the tank. Each channel has an outlet 524 laterally adjacent and separated from an inlet 523 by baffle 514. That is, each channel has an outlet and inlet to receive separate and different fluid flows 532, 531, 530 and 529 from different and separate heat exchangers. Please note the respective channels, respective vanes or baffles and respective fluid flows are directed or extend generally horizontally and parallel to one another. The respective fluid flows re-circulate through the respective channels and respective inlets and outlets to continue the regulation of temperatures of the tank by the heat transfer relationship between the fluid medium and tank outer peripheral wall.

It should be understood that device disclosures of FIGS. 25-31 configured with spaced apart inlets and outlets would use a fluid or air duct similar to tube 24 of FIG. 6 to provide fluid communication between the inlets and outlets. It should be understood that in describing device and system disclosures throughout this application, reference was made to more than one channel in several embodiments. However, by definition, a fluid channel provides fluid communication through out the device, and therefore, the respective channels are a single and continuous structure and only appear as more than one channel in some respective embodiments because of the difficulty of representing a three dimensional object on two dimensional paper.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of cooling a tank, the method comprising:
   providing a jacket configured to receive a tank, the jacket cooperating with the tank to form an enclosed space between the jacket and the tank, the tank comprising a height dimension;
   providing a plurality of planar baffles throughout the enclosed space to establish a fluid conduit;
   cooling a volume of gas;
   circulating the volume of gas through the fluid conduit of the enclosed space and in fluid communication with the tank to transfer heat between the gas and the tank, the circulating comprising moving the volume of the gas in a first direction along the height dimension and moving the volume of the gas in a second direction along the height dimension, the second direction opposite to the first direction; and
   wherein the moving of the volume of the gas in the second direction along the height dimension comprises moving the volume of the gas in a spiral pattern around the tank along the height dimension.

2. The method of claim 1 wherein the gas comprises air.

3. The method of claim 1 further comprising recirculating the volume of gas through the enclosed space and in fluid communication with the tank.

4. The method of claim 1 wherein the circulating of the volume of gas is performed under atmospheric pressure.

5. The method of claim 1 further comprising dehumidifying the volume of gas.

6. The method of claim 1 wherein the gas contacts an outer periphery of the tank.

7. The method of claim 1 wherein the gas contacts the jacket.

8. The method of claim 1 wherein the tank comprises an opening to function as an ingress and egress for an individual.

9. The method of claim 1 wherein the tank comprises an opening to function as an ingress and egress for an individual relative the tank.

10. The method of claim 1 wherein the cooling and the circulating of the volume of gas is provided by a heat exchanger, and wherein the entire structure of the heat exchanger is supported upon the jacket.

11. The method of claim 1 further comprising:
    forming slots into an interior wall of the jacket; and
    providing edge portions of the plurality of the planar baffles into the slots.

12. The method of claim 1 wherein the moving of the volume of the gas in the first direction comprises moving the volume of the gas in a spiral pattern around the tank.

13. The method of claim 1 wherein the providing of the plurality of the planar baffles comprises providing the baffles to rest against the tank in an arched configuration.

14. The method of claim 1 wherein the providing of the plurality of the planar baffles comprises providing the baffles to extend from the jacket to the tank in an arched configuration.

15. The method of claim 1 wherein the providing of the plurality of the planar baffles comprises providing the baffles to be secured only to the jacket.

16. The method of claim 1 wherein the providing of the plurality of the planar baffles comprises providing baffles to be secured only to the jacket and in contact with the tank.

17. The method of claim 1 wherein the providing of the jacket comprises providing a plurality of discrete segments of the jacket together.

18. The method of claim 1 wherein the providing of the jacket comprises providing a plurality of discrete segments of the jacket together, the plurality of the discrete segments being positioned one over another to cover in spaced relation different portions of the surface area of the tank.

19. The method of claim 18 wherein any percentage of the surface area of the tank can be covered in the spaced relation by the plurality of the discrete segments of the jacket.

20. The method of claim 18 wherein the providing of the jacket comprises forming the enclosed space relative any percentage of a surface area of the tank.

21. The method of claim 1 wherein the jacket comprises an opening, a first portion of the opening allowing the volume of the gas to enter the enclosed space and a second portion of the opening allowing the volume of the gas to exit the enclosed space.

22. The method of claim 1 wherein the cooling and the circulating of the volume of gas is provided by a heat exchanger, and wherein the jacket comprises an opening, a first portion of the opening allowing the volume of the gas to enter the enclosed space for the circulating and a second portion of the opening allowing the volume of the gas to exit the enclosed space and enter the heat exchanger for the cooling.

23. The method of claim 1 wherein the fluid conduit establishes a plurality of passageways for the movement of the volume of gas, wherein the volume of gas moves in a first direction through a first passageway and moves in a second direction through a second passageway, the first direction different from the second direction.

24. The method of claim 23 wherein the first direction is opposite to the second direction.

25. The method of claim 23 wherein the first passageway is adjacent the second passageway along the height dimension.

26. The method of claim 1 wherein the providing of the jacket comprises providing a single, continuous and uninterrupted structure.

* * * * *